(12) United States Patent
Kosaka et al.

(10) Patent No.: US 10,233,848 B2
(45) Date of Patent: Mar. 19, 2019

(54) CONTROL APPARATUS FOR INTERNAL COMBUSTION ENGINE

(71) Applicant: HONDA MOTOR CO., LTD, Minato-ku, Tokyo (JP)

(72) Inventors: Yosuke Kosaka, Wako (JP); Masaki Ueno, Wako (JP); Eri Itou, Wako (JP); Yuto Katori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 14/818,483

(22) Filed: Aug. 5, 2015

(65) Prior Publication Data

US 2016/0040606 A1 Feb. 11, 2016

(30) Foreign Application Priority Data

Aug. 6, 2014 (JP) .................................. 2014-160277

(51) Int. Cl.
   *F01L 1/34* (2006.01)
   *F02D 13/02* (2006.01)
   *F01L 1/344* (2006.01)

(52) U.S. Cl.
   CPC .......... *F02D 13/0207* (2013.01); *F01L 1/344* (2013.01); *Y02T 10/18* (2013.01)

(58) Field of Classification Search
   CPC ..... F01L 1/344; F01L 1/3442; F02D 13/0207; Y02T 10/18
   USPC ........................................... 123/90.15, 90.17
   See application file for complete search history.

(56) References Cited

U.S. PATENT DOCUMENTS 6,405,697 B2 * 6/2002 Mikame .............. F01L 1/34406
123/90.15

FOREIGN PATENT DOCUMENTS

| JP | 07-139378 | 5/1995 |
| JP | 2003-049671 | 2/2003 |
| JP | 2003-184586 | 7/2003 |
| JP | 2007-100522 | 4/2007 |

(Continued)

OTHER PUBLICATIONS

Watanabe, Valve Timing Control Apparatus for Internal Combustion Engine, US Patent Application Publication, Pub., No. US 2010/0218736 A1, Sep. 2, 2010.*

(Continued)

*Primary Examiner* — Ching Chang
(74) *Attorney, Agent, or Firm* — Amin, Turocy & Watson LLP

(57) ABSTRACT

A control apparatus for an internal combustion engine, which is capable of, when controlling a variable intake cam phase mechanism and a variable exhaust cam phase mechanism, ensuring a stable combustion of a mixture and improving the drivability, even when one of the two is in a failure state. The control apparatus includes an ECU. The ECU calculates an intake cam phase and an exhaust cam phase, determines, based on the calculated intake cam phase and exhaust cam phase, whether or not there has occurred a failure state of one of the mechanisms, in which the valve overlap period becomes longer than during a normal time, and controls, when it is determined that there has occurred the failure state of the one mechanism, the other mechanism such that the valve overlap period becomes shorter.

8 Claims, 15 Drawing Sheets

(56) References Cited

FOREIGN PATENT DOCUMENTS

JP    2012-031741    2/2012

OTHER PUBLICATIONS

Office Action for German Patent Application No. 10 2015 214 544.1 dated Apr. 4, 2016, 19 pages.
Search Report for German Patent Application No. 10 2015 214 544.1 dated Apr. 4, 2016, 16 pages.
Japanese Office Action dated Apr. 5, 2016 corresponding to U.S. Appl. No. 14/818,483, filed Aug. 5, 2015.

* cited by examiner

CONTROL APPARATUS FOR INTERNAL COMBUSTION ENGINE

CROSS-REFERENCE TO RELATED APPLICATION

This application is based upon and claims the benefit of priority from Japanese Patent Application No. 2014-160277 filed on Aug. 6, 2014, the contents of which are incorporated herein by reference.

BACKGROUND OF THE INVENTION

Field of the Invention

The present invention relates to a technique of control by a control apparatus for an internal combustion engine, for controlling a variable intake cam phase mechanism and a variable exhaust cam phase mechanism which change an intake cam phase and an exhaust cam phase, respectively, when there has occurred a failure state of one or more of the variable intake cam phase mechanism and the variable exhaust cam phase mechanism.

Description of the Related Art

Conventionally, there is known a control apparatus for an internal combustion engine, which is disclosed in Japanese Laid-Open Patent Publication (Kokai) No. 2012-31741. The engine is provided with a variable intake cam phase mechanism and a variable exhaust cam phase mechanism of a hydraulically-driven type. In the variable intake cam phase mechanism, the intake cam phase, which is a phase of the intake cam with respect to a crankshaft of the intake cam for opening and closing an intake valve, is changed between a predetermined most advanced value and a predetermined most retarded value, as supply hydraulic pressure from an intake-side hydraulic control valve is changed.

Further, in the variable exhaust cam phase mechanism, the exhaust cam phase, which is a phase of the exhaust cam with respect to a crankshaft of the exhaust cam for opening and closing an exhaust valve, is changed between a predetermined most advanced value and a predetermined most retarded value as a supply hydraulic pressure from the exhaust side hydraulic control valve is changed. In this case, when the intake cam phase is set to the most advanced value and the exhaust cam phase is set to the most retarded value, a valve overlap period of the intake valve and the exhaust valve becomes maximum.

In this control apparatus, during normal control, the intake cam phase and the exhaust cam phase are controlled to respective optimum values by controlling the variable intake cam phase mechanism and the variable exhaust cam phase mechanism, and if there has occurred a state where foreign matter is caught in one of the intake-side and exhaust-side hydraulic control valves, there are performed foreign matter removal control of the one of the intake-side and exhaust-side hydraulic control valves in which the foreign matter is caught, and phase maintaining control of the other of the hydraulic control valves. For example, if there has occurred a state where foreign matter is caught in the exhaust-side hydraulic control valve, there are performed exhaust-side foreign matter removal control of the exhaust-side hydraulic control valve and intake-side phase maintaining control of the intake-side hydraulic control valve.

In the exhaust-side foreign matter removal control, a spool valve of the exhaust-side hydraulic control valve is driven such that the spool valve repeats reciprocating motion between a position where the exhaust cam phase is set to most advanced value and a position where the exhaust cam phase is set to most retarded value, by controlling a duty ratio of a control input signal supplied to the exhaust-side hydraulic control valve such that it is repeatedly inverted between 0% and 100%. This resolves the state of the foreign matter being caught in the exhaust-side hydraulic control valve. Further, in the intake-side phase maintaining control, the intake-side hydraulic control valve is controlled such that the intake cam phase is maintained at a predetermined value α which is slightly advanced with respect to the most retarded value.

SUMMARY OF THE INVENTION

With the above-described conventional control apparatus for an internal combustion engine, in a case where in spite of execution of the intake-side or exhaust-side foreign matter removal control, if removal of the foreign matter fails, if normal control is performed in such a state, due to the fact that the variable intake cam phase mechanism or the variable exhaust cam phase mechanism does not work properly, the intake cam phase or the exhaust cam phase is not controlled to the optimum value, which may hold the valve overlap period in an improper state. In particular, in a case where the valve overlap period is held too long, the internal EGR amount or the scavenging gas amount may become too large. When the internal EGR amount thus becomes too large, combustion of a mixture may become unstable, and at worst, there may occur an accidental fire. When the scavenging gas amount becomes too large, the engine output may be unnecessarily increased, which may cause deterioration in the drivability. the above problems occur even in a case where as each of a variable intake cam phase mechanism and a variable exhaust cam phase mechanism, an electrically-driven type, which is formed by combining an electric motor and a gear mechanism, is used in place of a hydraulically-driven type.

It is therefore an object of the present invention to provide a control apparatus for an internal combustion engine, which is capable of, when controlling a variable intake cam phase mechanism and a variable exhaust cam phase mechanism, ensuring stable combustion of a mixture and improving drivability, even when one or more of the variable intake cam phase mechanism and the variable exhaust cam phase mechanism is in a failure state.

To attain the above object, the present invention provides a control apparatus for an internal combustion engine that includes a variable intake cam phase mechanism for changing an intake cam phase which is a phase of an intake cam for opening and closing an intake valve with respect to a crankshaft, and a variable exhaust cam phase mechanism for changing an exhaust cam phase which is a phase of an exhaust cam for opening and closing an exhaust valve with respect to the crankshaft, and is capable of changing a valve overlap period of the intake valve and the exhaust valve by changing one or more of the intake cam phase and the exhaust cam phase, the control apparatus controlling one or more of the variable intake cam phase mechanism and the variable exhaust cam phase mechanism, comprising intake cam phase acquisition means for acquiring the intake cam phase, exhaust cam phase acquisition means for acquiring the exhaust cam phase, first failure determination means for determining, based on the acquired intake cam phase and the acquired exhaust cam phase, whether or not there has occurred a first failure state which is a failure state of one mechanism of the variable intake cam phase mechanism and the variable exhaust cam phase mechanism, in which the valve overlap period becomes longer than a normal overlap period, and first failure control means for controlling, when it is determined by the first failure determination means that there has occurred the first failure state of the one mechanism, the other mechanism of the variable intake cam phase mechanism and the variable exhaust cam phase mechanism to shorten the valve overlap period.

With the configuration of this control apparatus for the internal combustion engine, it is determined, based on the acquired intake cam phase and the acquired exhaust cam phase, whether or not there has occurred the first failure state which is a failure state of one of the variable intake cam phase mechanism and the variable exhaust cam phase mechanism in which the valve overlap period becomes longer than a normal overlap period, and when it is determined that there has occurred the first failure state of the one mechanism, the other mechanism of the variable intake cam phase mechanism and the variable exhaust cam phase mechanism is controlled to shorten the valve overlap period. With this, when controlling the variable intake cam phase mechanism and the variable exhaust cam phase mechanism, even if there has occurred the first failure state of one of the variable intake cam phase mechanism and the variable exhaust cam phase mechanism, it is possible, by controlling the other mechanism to shorten the valve overlap period, to avoid a state in which the valve overlap period becomes too long to thereby prevent the internal EGR amount from becoming too large and the scavenging gas amount from becoming too large. Therefore, it is possible to ensure stable combustion of the mixture and improve the drivability. Consequently, it is possible to enhance marketability. Note that throughout the specification, the term "acquire" in "acquiring the intake cam phase" and "acquiring the exhaust cam phase" is intended to mean calculating these values based on other parameters or directly detecting these values using sensors.

In one embodiment, the first failure control means controls, when there has occurred the first failure state of the one mechanism, the other mechanism such that a phase of the intake cam phase and the exhaust cam phase, which is changed by the other mechanism, becomes a value, which makes the valve overlap period shortest, within a variable range of the phase.

With the configuration of this embodiment, when there has occurred the first failure state of the one mechanism, the other mechanism is controlled such that one of the intake cam phase and the exhaust cam phase, which is changed by the other mechanism, becomes a value, which makes the valve overlap period shortest, within a variable range of the phase. This makes it possible to positively avoid the state in which the valve overlap period becomes too long, to thereby further enhance marketability.

In another embodiment, the control apparatus further comprises second failure determination means for determining, based on the intake cam phase and the exhaust cam phase, whether or not there has occurred a second failure state which is a failure state of one or more of the variable intake cam phase mechanism and the variable exhaust cam phase mechanism, in which the valve overlap period becomes shorter than a normal overlap period, and second failure control means for normally controlling, when it is determined by the second failure determination means that there has occurred the second failure state of the one mechanism, the other mechanism of the variable intake cam phase mechanism and the variable exhaust cam phase mechanism.

With the configuration of this embodiment, it is determined, based on the acquired intake cam phase and the acquired exhaust cam phase, whether or not there has occurred the second failure state which is a failure state of one or more of the variable intake cam phase mechanism and the variable exhaust cam phase mechanism, in which the valve overlap period becomes shorter than a normal overlap period, and if it is determined that there has occurred the second failure state of the one mechanism, the other mechanism of the variable intake cam phase mechanism and the variable exhaust cam phase mechanism is normally controlled. In this case, when there has occurred the second failure state of the one mechanism, the valve overlap period does not become longer than a normal overlap period, so that there is no need to control the other mechanism such that the valve overlap period becomes shorter than the normal overlap period. Therefore, when there has occurred the second failure state of the one mechanism, by normally controlling the other mechanism, it is possible to ensure stable combustion of the mixture and excellent drivability while positively avoiding the state in which the valve overlap period becomes too long, similarly to when the cam phase mechanisms are normal.

The above and other objects, features, and advantages of the present invention will become more apparent from the following detailed description taken in conjunction with the accompanying drawings.

DETAILED DESCRIPTION

Figure 1:
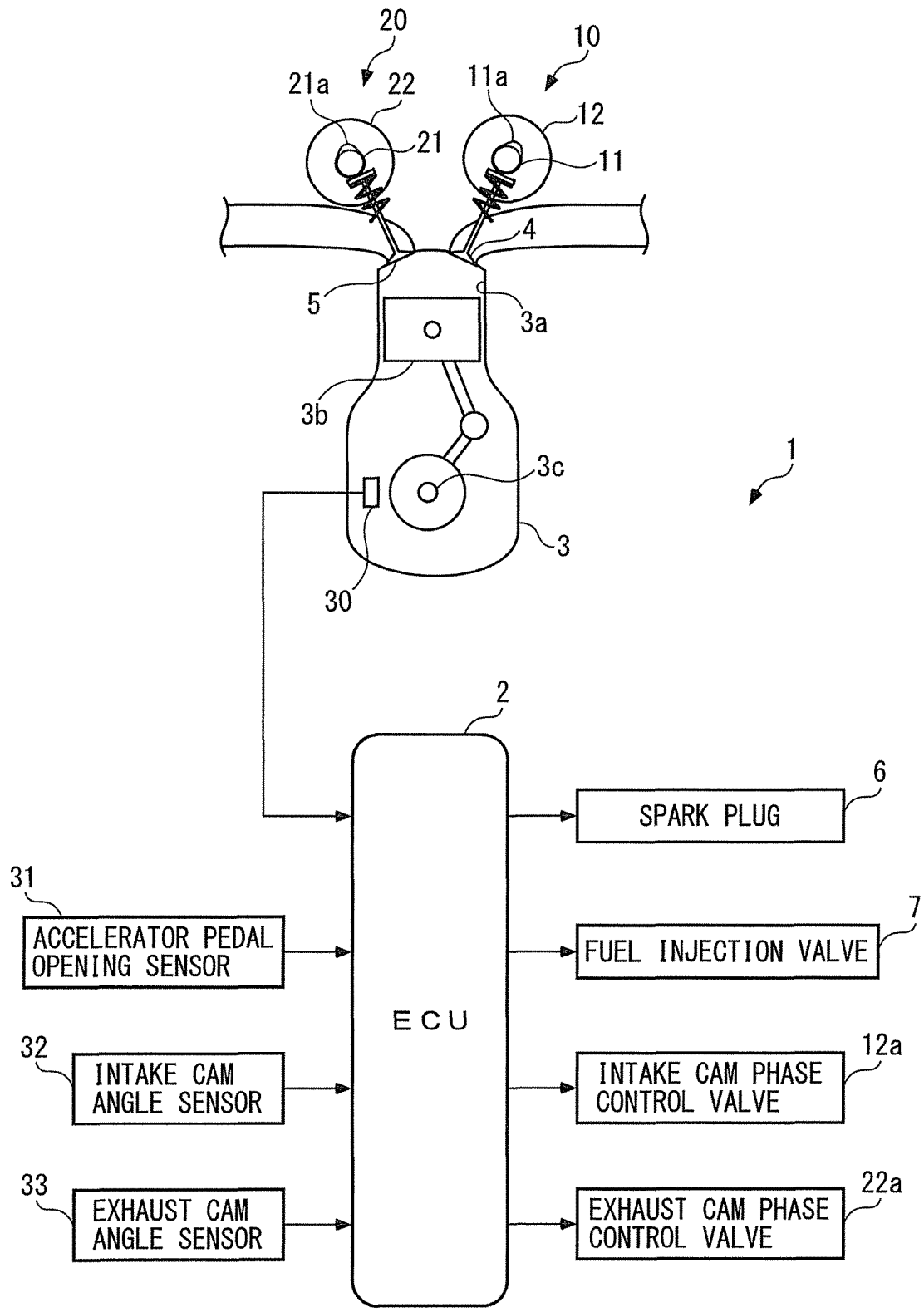
FIG. 1 is a schematic diagram of a control apparatus according to an embodiment of the present invention and an internal combustion engine to which the control apparatus is applied.

The invention will now be described in detail with reference to the drawings showing an embodiment thereof. As shown in FIG. 1, the control apparatus 1 includes an ECU 2 (electronic control unit), which performs various control processes, such as a cam phase control process, according to operating conditions of an internal combustion engine (hereinafter simply referred to as "the engine") 3, as described hereinafter.

The engine 3 is an in-line four-cylinder gasoline engine having four pairs of cylinders 3a and pistons 3b (only one pair of which is shown), and is installed on a vehicle, not shown. It is noted that the vehicle can contain any number of pairs of cylinders and pistons, including three, six, and eight. Further, the engine 3 includes intake valves 4 (only one of which is shown) provided for each cylinder 3a, exhaust valves 5 (only one of which is shown) provided for each cylinder 3a, and an intake valve-actuating mechanism 10 for actuating the intake valves 4 to open and close the same, and an exhaust valve-actuating mechanism 20 for actuating the exhaust valves 5 to open and close the same.

The intake valve-actuating mechanism 10 is comprised of an intake cam shaft 11 for actuating each intake valve 4 by an associated intake cam 11a, and a variable intake cam phase mechanism 12. The variable intake cam phase mechanism 12 changes the valve timing of each intake valve 4 by steplessly (i.e. continuously) changing a relative phase CAIN of the associated intake cam ha, i.e. the intake cam shaft 11, with respect to a crankshaft 3c (hereinafter referred to as "the intake cam phase CAIN") toward an advanced side or a retarded side. The variable intake cam phase mechanism 12 is disposed on an end of the intake cam shaft 11 toward an intake sprocket (not shown).

The variable intake cam phase mechanism 12 is of a hydraulically-driven type, specifically with an arrangement similar to that proposed e.g. in Japanese Laid-Open Patent Publication (Kokai) No. 2007-100522 by the present applicant, and hence detailed description thereof is omitted, but it includes an intake cam phase control valve 12a, a hydraulic circuit (not shown), a return spring (not shown), and so forth. The intake cam phase control valve 12a is formed by combining a solenoid and a spool valve (none of which are shown).

In the intake cam phase control valve 12a, when a control input signal is input thereto from the ECU 2, the solenoid is driven according to the duty ratio of the control input signal, whereby the spool valve is actuated. This changes hydraulic pressure supplied from the hydraulic circuit to an advance chamber and a retard chamber of the variable intake cam phase mechanism 12. Consequently, the intake cam phase CAIN is changed between a predetermined origin value CAIN_0 and a predetermined most advanced value CAIN_ADV, whereby the valve timing of each intake valve 4 is steplessly changed between the origin timing indicated by a broken line in FIG. 2 and the most advanced timing indicated by a solid line in FIG. 2. In this case, the origin value CAIN_0 is set to 0, and the most advanced value CAIN_ADV is set to a predetermined positive value.

As described above, the intake cam phase CAIN is variably set in a range between the origin value CAIN_0 and the most advanced value CAIN_ADV, and when the intake cam phase CAIN is at the origin value CAIN_0, the valve overlap period of the intake valve 4 and the exhaust valve 5 becomes the shortest, and as the intake cam phase CAIN is increased from the origin value CAIN_0, the valve timing of the intake valve 4 is changed from the origin timing toward the advanced side, whereby the valve overlap period is made longer.

Further, the ECU 2 sets the duty ratio of the control input signal supplied to the intake cam phase control valve 12a within a range of 0 to 100%. In this case, when the duty ratio of the control input signal is equal to 0%, supply of the control input signal to the intake cam phase control valve 12a is stopped, whereby the intake cam phase CAIN is held at the origin value CAIN_0 by the urging force of the above-mentioned return spring. That is, when the supply of the control input signal to the intake cam phase control valve 12a is stopped, the intake cam phase CAIN is held at the origin value CAIN_0 without being changed to be more retarded with respect to the origin value CAIN_0, due to the structure of the variable intake cam phase mechanism 12.

On the other hand, the exhaust valve-actuating mechanism 20 is comprised of an exhaust cam shaft 21 for actuating each exhaust valve 5 by an associated exhaust cam 21a, and a variable exhaust cam phase mechanism 22. The variable exhaust cam phase mechanism 22 changes the valve timing of each exhaust valve 5 by steplessly (i.e. continuously) changing a relative phase CAEX of the associated exhaust cam 21a, i.e. the exhaust cam shaft 21, with respect to the crankshaft 3c (hereinafter referred to as "the exhaust cam phase CAEX") toward an advanced side or a retarded side. The variable exhaust cam phase mechanism 22 is disposed at an end of the exhaust cam shaft 21 toward an exhaust sprocket (not shown).

The variable exhaust cam phase mechanism 22 is of a hydraulically-driven type, with an arrangement similar to that of the above-described variable intake cam phase mechanism 12, and includes an exhaust cam phase control valve 22a, a hydraulic circuit (not shown), a return spring (not shown), and so forth. Similar to the intake cam phase control valve 12a, the exhaust cam phase control valve 22a is also formed by combining a solenoid and a spool valve (none of which are shown).

In the exhaust cam phase control valve 22a, when a control input signal is input thereto from the ECU 2, the solenoid is driven according to the duty ratio of the control input signal, whereby the spool valve is actuated. This changes hydraulic pressure supplied from the hydraulic circuit to an advance chamber and a retard chamber of the variable intake cam phase mechanism 12. Consequently, the exhaust cam phase CAEX is changed between a predetermined origin value CAEX_0 and a predetermined most retarded value CAEX_RET, whereby the valve timing of each exhaust valve 5 is steplessly changed between the origin timing indicated by a broken line in FIG. 2 and the most retarded timing indicated by a solid line in FIG. 2. In this case, the origin value CAEX_0 is set to 0, and the most retarded value CAEX_RET is set to a predetermined positive value.

As described above, the exhaust cam phase CAEX is variably set in a range between the origin value CAEX_0 and the most retarded value CAEX_RET, and when the exhaust cam phase CAEX is at the origin value CAEX_0, the valve overlap period becomes the shortest, and as the exhaust cam phase CAEX is increased from the most retarded value CAEX_RET, the valve timing of the exhaust valve 5 is changed from the origin timing toward the retarded side, whereby the valve overlap period is made longer.

Further, the ECU 2 set the duty ratio of the control input signal supplied to the exhaust cam phase control valve 22a in a range of 0 to 100%. In this case, when the duty ratio of the control input signal is equal to 0%, the supply of the control input signal to the exhaust cam phase control valve 22a is stopped, whereby the exhaust cam phase CAEX is held at the origin value CAEX_0 by the urging force of the above-mentioned return spring. That is, when the supply of the control input signal to the exhaust cam phase control valve 22a is stopped, the exhaust cam phase CAEX is held at the origin value CAEX_0 without being changed to be more advanced with respect to the origin value CAEX_0, due to the structure of the variable exhaust cam phase mechanism 22.

The engine 3 includes spark plugs 6, fuel injection valves 7, and a crank angle sensor 30, and each spark plug 6 and the fuel injection valve 7 are provided for each cylinder 3a (only one of each is shown).

The spark plug 6 is mounted through the cylinder head of the engine 3 and is electrically connected to the ECU 2, and the discharge timing of the spark plug 6 is controlled by the ECU 2. That is, the ignition timing of a mixture is controlled. Further, each fuel injection valve 7 is mounted through the cylinder head such that fuel is directly injected in to each cylinder 3a. The fuel injection valve 7 is electrically connected to the ECU 2, and the amount of fuel injection and fuel injection timing thereby are controlled by the ECU 2.

On the other hand, the crank angel sensor 30 outputs a CRK signal, which is a pulse signal, to the ECU 2 along with rotation of the crankshaft 3c. One pulse of the CRK signal is output whenever the crankshaft 3c rotates through a predetermined angle (e.g. 1°), and the ECU 2 calculates a rotational speed NE of the engine 3 (hereinafter referred to as "the engine speed NE") based on the CRK signal.

Further, the ECU 2 has an accelerator pedal opening sensor 31, an intake cam angle sensor 32, and an exhaust cam angle sensor 33, electrically connected thereto. The accelerator opening sensor 31 detects a stepped-on amount (hereinafter referred to as "accelerator pedal opening") AP of an accelerator pedal, not shown, and outputs a detection signal indicative of the detected accelerator opening AP to the ECU 2.

Further, the intake cam angle sensor 32 is disposed at an end of the intake cam shaft 11 on a side thereof opposite to the variable intake cam phase mechanism 12. The intake cam angle sensor 32 outputs an intake CAM signal, which is a pulse signal, to the ECU 2 along with rotation of the intake cam shaft 11 whenever the intake cam shaft 11 rotates through a predetermined cam angle (e.g. 1°). The ECU 2 calculates the intake cam phase CAIN based on the intake CAM signal and the above-mentioned CRK signal.

Further, the exhaust cam angle sensor 33 is disposed at, an end of the exhaust cam shaft 21 on a side thereof opposite to the variable exhaust cam phase mechanism 22, and outputs an exhaust CAM signal, which is a pulse signal, to the ECU 2 along with rotation of the exhaust cam shaft 21 whenever the exhaust cam shaft 21 rotates through a predetermined cam angle (e.g. 1°). The ECU 2 calculates the exhaust cam phase CAEX based on the exhaust CAM signal and the above-mentioned CRK signal.

In the present embodiment, the crank angle sensor 30 corresponds to intake cam phase acquisition means and exhaust cam phase acquisition means, the intake cam angle sensor 32 corresponds to the intake cam phase acquisition means, and the exhaust cam angle sensor 33 corresponds to the exhaust cam phase acquisition means.

The ECU 2 is implemented by a microcomputer comprised of one or more of a CPU, a RAM, an EEPROM, a ROM, and an I/O interface (none of which are specifically shown), and performs a cam phase control process and so forth, as described hereinafter, according to the detection signals from the aforementioned sensors 30 to 33, and the like. In the present embodiment, the ECU 2 corresponds to the intake cam phase acquisition means, the exhaust cam phase acquisition means, first failure determination means, first failure control means, second failure determination means, and second failure control means.

Next, a description will be given of the cam phase control process with reference to FIG. 3. The cam phase control process is for controlling the intake cam phase CAIN and the exhaust cam phase CAEX by controlling the variable intake cam phase mechanism 12 and the variable exhaust cam phase mechanism 22, and is performed by the ECU 2 at a predetermined control period $\Delta T$ (e.g. 10 msec).

Note that it is assumed that in various flags which are set in control processes, described hereinafter, values of two flags F_IN_NG and F_EX_NG are stored and held in the EEPROM of the ECU 2 irrespective of an ON/OFF state of the ignition switch. Values of the other flags than the above flags are stored in the RAM when the ignition switch is in an ON state, and are reset to 0 when the ignition switch is turned off.

Figure 3:
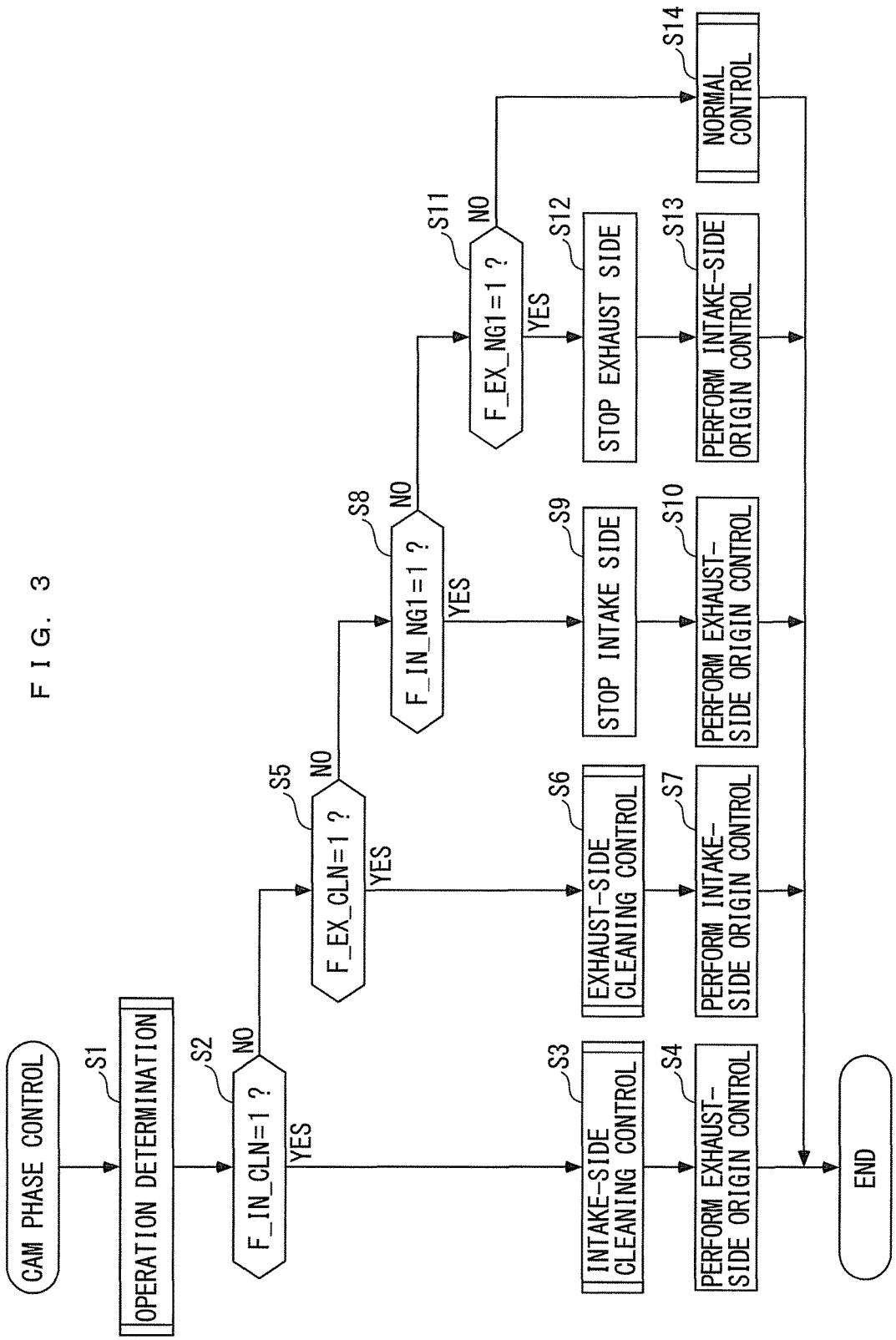
FIG. 3 is a flowchart of a cam phase control process.

As shown in FIG. 3, first, in a step 1 (shown as S1 in abbreviated form in FIG. 3; the following steps are also shown in abbreviated form), an operation determination process is performed. The operation determination process is for determining whether or not the variable intake cam phase mechanism 12 and the variable exhaust cam phase mechanism 22 are in proper operation, and is specifically executed as shown in FIG. 4.

Figure 4:
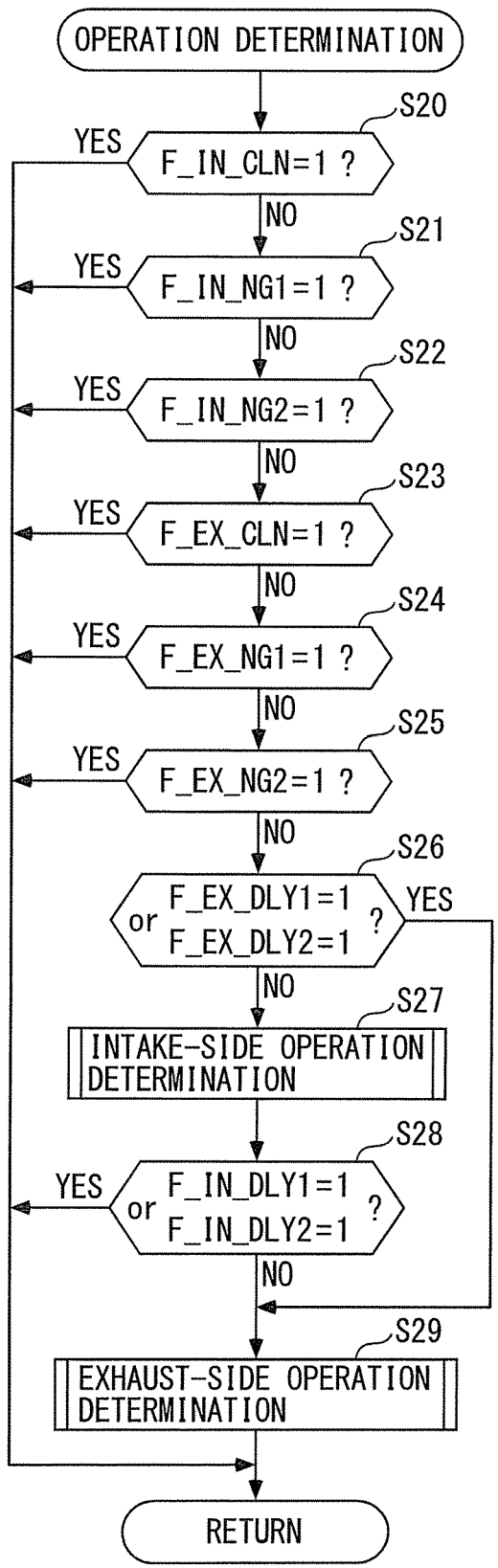
FIG. 4 is a flowchart of an operation determination process.

Referring to FIG. 4, first, in a step 20, it is determined whether or not an intake-side cleaning condition flag F_IN_CLN is equal to 1. The intake-side cleaning condition flag F_IN_CLN is for indicating whether or not conditions for performing an intake-side cleaning control process are satisfied, described hereinafter.

If the answer to the question of the step 20 is affirmative (YES), i.e. if the conditions for performing the intake-side cleaning control process are satisfied, the present process is immediately terminated.

On the other hand, if the answer to the question of the step 20 is negative (NO), the process proceeds to a step 21, wherein it is determined whether or not an intake-side first failure flag F_IN_NG1 is equal to 1. The intake-side first failure flag F_IN_NG1 is for indicating whether or not the variable intake cam phase mechanism 12 is in an intake-side first failure state, and the intake-side first failure state corresponds to a failure state in which the intake cam phase CAIN is held at a value advanced by not smaller than a predetermined abnormal advance reference value CAIN_ERR1, referred to hereinafter.

If the answer to the question of the step 21 is affirmative (YES), i.e. if the variable intake cam phase mechanism 12 is in the intake-side first failure state, the present process is immediately terminated.

On the other hand, if the answer to the question of the step 21 is negative (NO), the process proceeds to a step 22, wherein it is determined whether or not an intake-side second failure flag F_IN_NG2 is equal to 1. The intake-side second failure flag F_IN_NG2 is for indicating whether or not the variable intake cam phase mechanism 12 is in an intake-side second failure state, and the intake-side second failure state corresponds to a failure state in which the intake cam phase CAIN is fixed and held at the origin value CAIN_0 in spite of the fact that the control input signal is supplied to the intake cam phase control valve 12a so as to cause the intake cam phase CAIN to become a larger value than the origin value CAIN_0.

If the answer to the question of the step 22 is affirmative (YES), i.e. if the variable intake cam phase mechanism 12 is in the intake-side second failure state, the present process is immediately terminated.

On the other hand, if the answer to the question of the step 22 is negative (NO), the process proceeds to a step 23, wherein it is determined whether or not an exhaust-side cleaning condition flag F_EX_CLN is equal to 1. The exhaust-side cleaning condition flag F_EX_CLN is for indicating whether or not conditions for performing an exhaust-side cleaning control process are satisfied.

If the answer to the question of the step 23 is affirmative (YES), i.e. if the conditions for performing the exhaust-side cleaning control process are satisfied, the present process is immediately terminated.

On the other hand, if the answer to the question of the step 23 is negative (NO), the process proceeds to a step 24, wherein it is determined whether or not an exhaust-side first failure flag F_EX_NG1 is equal to 1. The exhaust first failure flag F_EX_NG1 is for indicating whether or not the variable exhaust cam phase mechanism 22 is in an exhaust-side first failure state, and the exhaust-side first failure state corresponds to a failure state in which the exhaust cam phase CAEX is held at a value retarded by not smaller than a predetermined abnormal retard reference value CAEX_ERR1, referred to hereinafter.

If the answer to the question of the step 24 is affirmative (YES), i.e. if the variable exhaust cam phase mechanism 22 is in the exhaust-side first failure state, the present process is immediately terminated.

On the other hand, if the answer to the question of the step 24 is negative (NO), the process proceeds to a step 25, wherein it is determined whether or not an exhaust-side second failure flag F_EX_NG2 is equal to 1. The exhaust-side second failure flag F_EX_NG2 is for indicating whether or not the variable exhaust cam phase mechanism 22 is in an exhaust-side second failure state, and the exhaust-side second failure state corresponds to a failure state in which the exhaust cam phase CAEX is fixed and held at the origin value CAEX_0 in spite of the fact that the control input signal is supplied to the exhaust cam phase control valve 22a so as to cause the exhaust cam phase CAEX to become a larger value than the origin value CAEX_0.

If the answer to the question of the step 25 is affirmative (YES), i.e. if the variable exhaust cam phase mechanism 22 is in the exhaust-side second failure state, the present process is immediately terminated.

On the other hand, if the answer to the question of the step 25 is negative (NO), the process proceeds to a step 26, wherein it is determined whether or not an exhaust-side first delay flag F_EX_DLY1 or an exhaust-side second delay flag F_EX_DLY2 is equal to 1. If the answer to the question of the step 26 is affirmative (YES), i.e. if an exhaust-side first delay process or an exhaust-side second delay process, described hereinafter, is being performed, the process proceeds to a step 29, described hereinafter.

On the other hand, if the answer to the question of the step 26 is negative (NO), the process proceeds to a step 27, wherein an intake-side operation determination process is performed. The intake-side operation determination process is for determining whether or not there the variable intake cam phase mechanism 12 is in an abnormal operation state, and is specifically performed as shown in FIG. 5.

Figure 5:
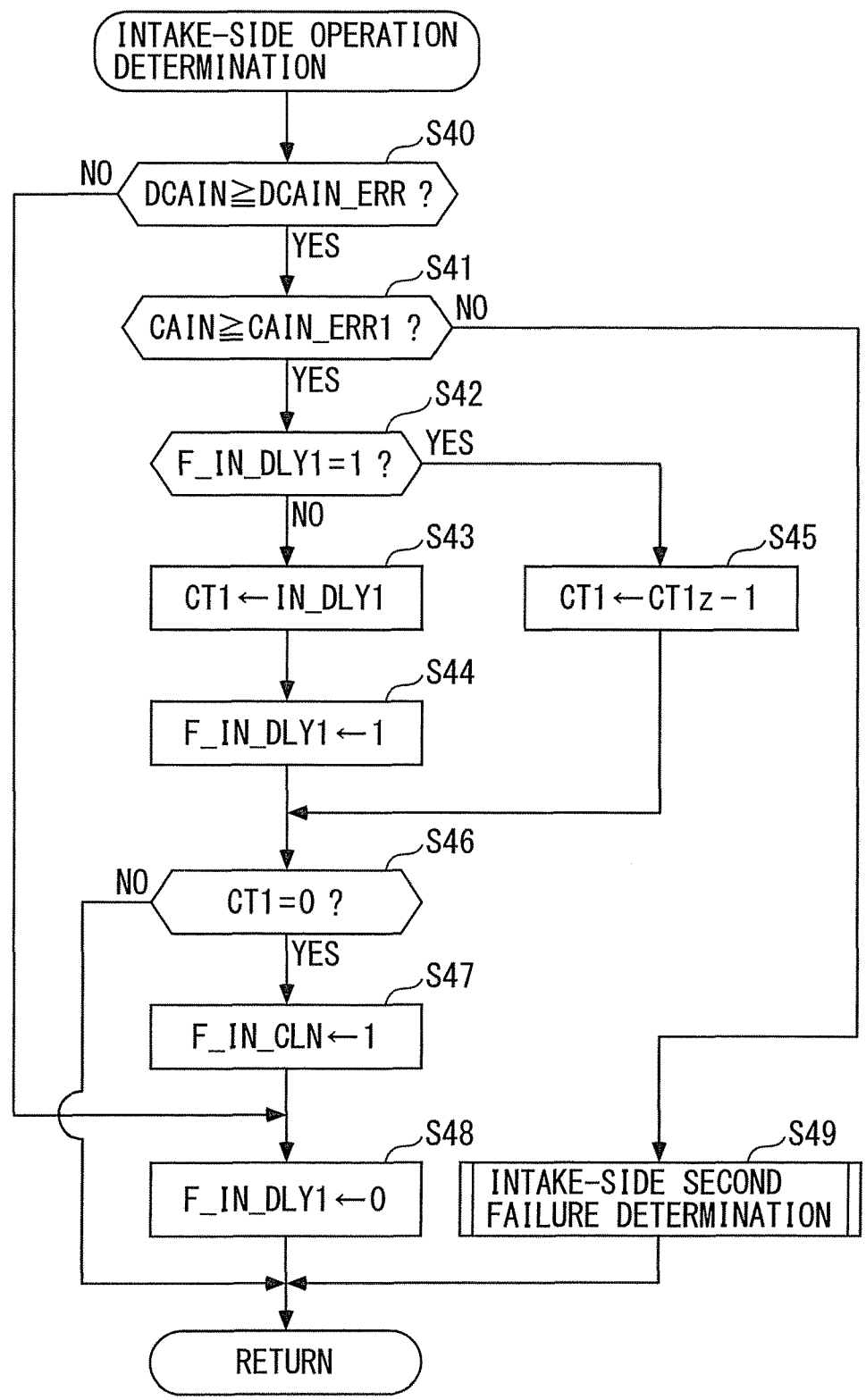
FIG. 5 is a flowchart of an intake-side operation determination process.

Referring to FIG. 5, first, in a step 40, it is determined whether or not an intake cam phase difference DCAIN is not smaller than a predetermined abnormal reference value DCAIN_ERR. The intake cam phase difference DCAIN is an absolute value |CAIN_CMD−CAIN| of the difference between a target intake cam phase CAIN_CMD, referred to hereinafter, and the intake cam phase CAIN, and the abnormal reference value DCAIN_ERR is set to a predetermined positive value with reference to which it is estimated, when the intake cam phase difference DCAIN is not smaller than the abnormal reference value DCAIN_ERR, that the variable intake cam phase mechanism 12 is in an abnormal state.

If the answer to the question of the step 40 is negative (NO), i.e. if the variable intake cam phase mechanism 12 is in a normal state, to indicate that an intake-side first delay process is not being performed, the process proceeds to a step 48, wherein an intake-side first delay flag F_IN_DLY1 is set to 0, followed by terminating the present process.

On the other hand, if the answer to the question of the step 40 is affirmative (YES), the process proceeds to a step 41, wherein it is determined whether or not the intake cam phase CAIN is not smaller than the predetermined abnormal advance reference value CAIN_ERR1. The abnormal advance reference value CAIN_ERR1 is set to such a value as will cause CAIN<CAIN_ERR1 to always hold when the variable intake cam phase mechanism 12 is in a normal state, and will cause CAIN≥CAIN_ERR1 to hold only when the variable intake cam phase mechanism 12 is in an abnormal advance state e.g. due to the fact that the intake cam phase control valve 12a is in a foreign matter-caught state.

If the answer to the question of the step 41 is affirmative (YES), i.e. if the variable intake cam phase mechanism 12 is in the abnormal advance state, the process proceeds to a step 42, wherein it is determined whether or not the intake-side first delay flag F_IN_DLY1 is equal to 1. If the answer to the question of the step 42 is negative (NO), i.e. if the intake-side first delay process is not being performed, the process proceeds to a step 43, wherein a count value CT1 of an intake-side first delay counter is set to a predetermined intake-side first delay value IN_DLY1.

Next, the process proceeds to a step 44, wherein the intake-side first delay flag F_IN_DLY1 is set to 1 in order to indicate that the intake-side first delay process is being performed.

After the intake-side first delay flag F_IN_DLY1 is thus set to 1 in the step 44, the answer to the question of the above-mentioned step 42 becomes affirmative (YES) in the next and subsequent times of execution of this step, and in this case, the process proceeds to a step 45, wherein the count value CT1 of the intake-side first delay counter is set to a value (CT1z−1) calculated by subtracting 1 from the immediately preceding value CT1z. That is, the count value CT1 of the intake-side first delay counter is decremented by 1.

In a step 46 following the above step 44 or 45, it is determined whether or not the count value CT1 of the intake-side first delay counter is equal to 0. If the answer to the question of the step 46 is negative (NO), i.e. if CT1≠0 holds, the present process is immediately terminated.

On the other hand, if the answer to the question of the step 46 is affirmative (YES), i.e. if a state in which CAIN≥CAIN_ERR1 holds has continued for a time period corresponding to a value ΔT·IN_DLY1, it is determined that the intake-side cleaning control process should be performed due to the fact that the variable intake cam phase mechanism 12 continues to be in the abnormal advance state, and to indicate this, the process proceeds to a step 47, wherein the intake-side cleaning condition flag F_IN_CLN is set to 1.

Next, the process proceeds to the above-mentioned step 48, wherein the intake-side first delay flag F_IN_DLY1 is set to 0 in order to indicate that the intake-side first delay process is terminated, followed by terminating the present process.

On the other hand, if the answer to the question of the above-mentioned step 41 is negative (NO), i.e. CAIN<CAIN_ERR1 holds, the process proceed to a step 49, wherein an intake-side second failure determination process is performed.

Figure 6:
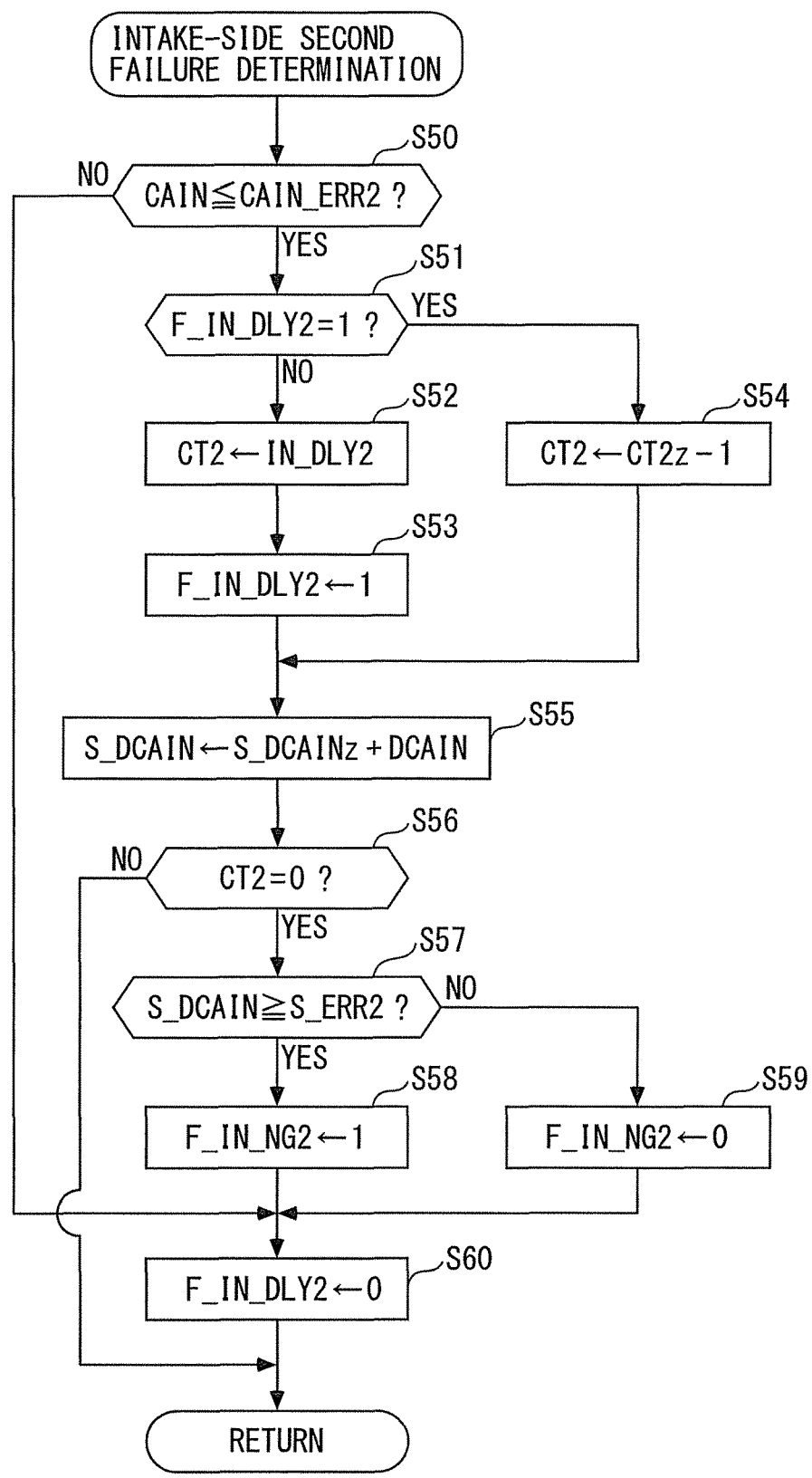
FIG. 6 is a flowchart of an intake-side second failure determination process.

The intake-side second failure determination process is for determining whether or not the variable intake cam phase mechanism 12 is in the above-mentioned intake-side second failure state, and is specifically performed as shown in FIG. 6.

Referring to FIG. 6, first, in a step 50, it is determined whether or not the intake cam phase CAIN is not larger than a predetermined origin fixation reference value CAIN_ERR2. The predetermined origin fixation reference value CAIN_ERR2 is set to a value slightly larger than the origin value CAIN_0.

If the answer to the question of the step 50 is negative (NO), i.e. if CAIN>CAIN_ERR2 holds, to indicate that an intake-side second delay process is not being performed, the process proceeds to a step 60, wherein an intake-side second delay flag F_IN_DLY2 is set to 0, followed by terminating the present process.

On the other hand, if the answer to the question of the step 50 is affirmative (YES), the process proceeds to a step 51, wherein it is determined whether or not the intake-side second delay flag F_IN_DLY2 is equal to 1. If the answer to the question of the step 51 is negative (NO), i.e. if the intake-side second delay process is not being performed, the process proceeds to a step 52, wherein a count value CT2 of an intake-side second delay counter is set to a predetermined intake-side second delay value IN_DLY2.

Next, the process proceeds to a step 53, wherein the intake-side second delay flag F_IN_DLY2 is set to 1 to indicate that the intake-side second delay process is being performed.

After the intake-side second delay flag F_IN_DLY2 is thus set to 1 in the step 53, the answer to the question of the above-mentioned step 51 becomes affirmative (YES) in the next and subsequent times of execution of this step, and in this case, the process proceeds to a step 54, wherein the count value CT2 of the intake-side second delay counter is set to a value (CT2$z$−1) calculated by subtracting 1 from the immediately preceding value CT2$z$.

In a step 55 following the above step 53 or 54, an integrated intake cam phase difference S_DCAIN which is an integrated value of the intake cam phase difference DCAIN is set to a sum S_DCAINz+DCAIN of the immediately preceding value S_DCAINz of the integrated intake cam phase difference S_DCAIN and the intake cam phase difference DCAIN. In this case, an initial value of the immediately preceding value S_DCAINz of the integrated intake cam phase difference is set to 0.

Next, the process proceeds to a step 56, wherein it is determined whether or not the count value CT2 of the intake-side second delay counter is equal to 0. If the answer to the question of the step 56 is negative (NO), i.e. if CT2≠0 holds, the present process is immediately terminated.

On the other hand, if the answer to the question of the step 56 is affirmative (YES), i.e. if a state in which CAIN≤CAIN-_ERR2 holds has continued for a time period corresponding to a value ΔT·IN_DLY2, the process proceeds to a step 57, wherein it is determined whether or not the integrated intake cam phase difference S_DCAIN is not smaller than a predetermined second failure reference value S_ERR2.

If the answer to the question of the step 57 is affirmative (YES), i.e. if S_DCAIN≥S_ERR2 holds, it is determined that the variable intake cam phase mechanism 12 is the intake-side second failure state, and to indicate this, the process proceeds to a step 58, wherein the intake-side second failure flag F_IN_NG2 is set to 1.

On the other hand, if the answer to the question of the step 57 is negative (NO), i.e. if S_DCAIN<S_ERR2 holds, it is determined that the variable intake cam phase mechanism 12 is not in the intake-side second failure state, and to indicate this, the process proceeds to a step 59, wherein the intake-side second failure flag F_IN_NG2 is set to 0.

In the step 60 following the above step 58 or 59, to indicate that the intake-side second delay process is terminated, the intake-side second delay flag F_IN_DLY2 is set to 0, followed by terminating the present process.

Referring again to FIG. 5, after the intake-side second failure determination process is performed in the step 49 as described above, the intake-side operation determination process in FIG. 5 is terminated.

Referring again to FIG. 4, after the intake-side operation determination process is performed in the step 27, as described above, the process proceeds to a step 28, wherein it is determined whether or not the intake-side first delay flag F_IN_DLY1 or the intake-side second delay flag F_IN_DLY2 is equal to 0. If the answer to the question of the step 28 is affirmative (YES), i.e. if the intake-side first delay process or the intake-side second delay process is being performed, the present process is immediately terminated.

On the other hand, if the answer to the question of the step 28 is negative (NO), or if the answer to the question of the above-mentioned step 26 is affirmative (YES), the process proceeds to the step 29, wherein an exhaust-side operation determination process is performed. The exhaust-side operation determination process is for determining whether or not the variable exhaust cam phase mechanism 22 is in an abnormal operation state, and is specifically performed as shown in FIG. 7.

Figure 7:
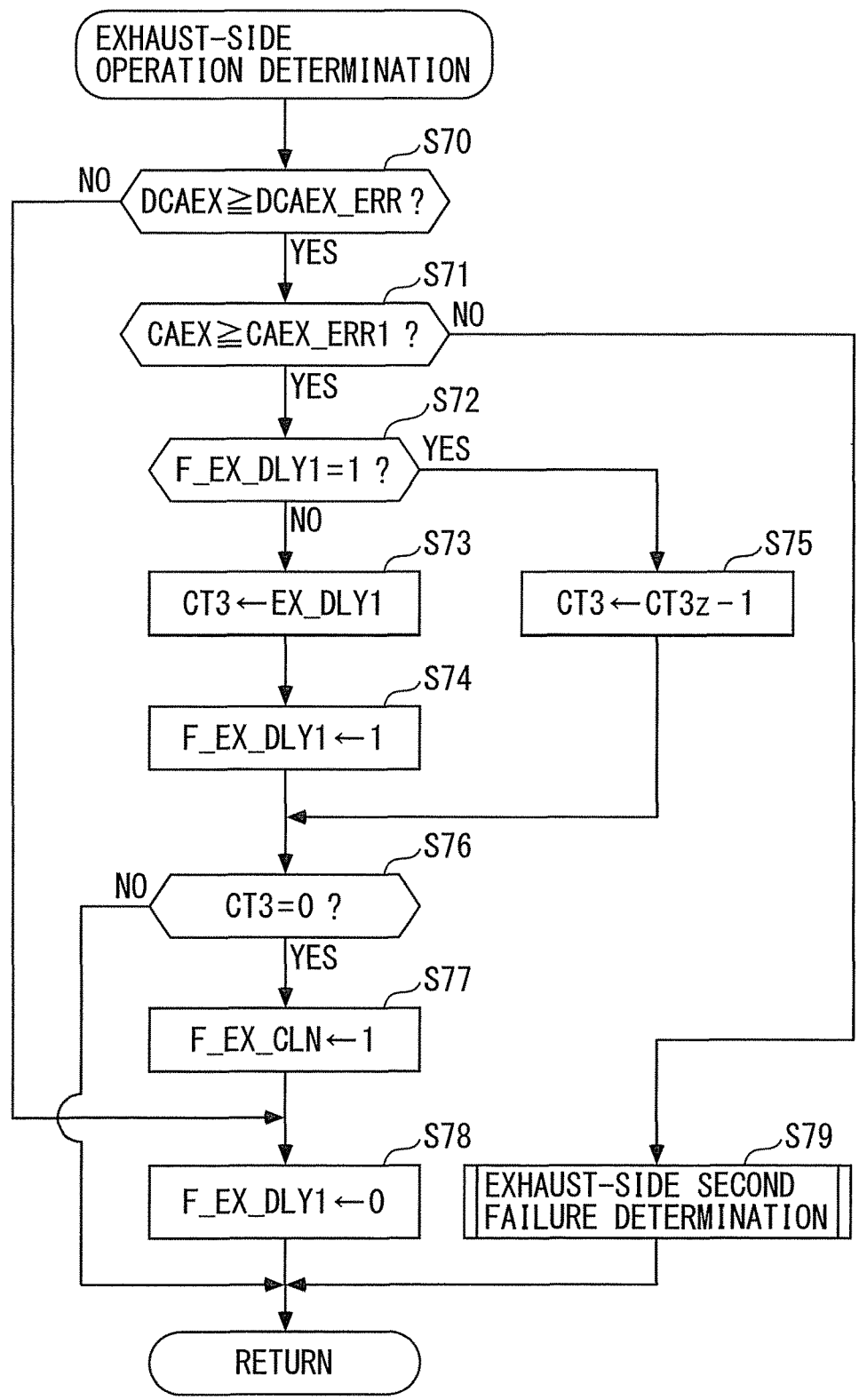
FIG. 7 is a flowchart of an exhaust-side operation determination process.

Referring to FIG. 7, first, in a step 70, it is determined whether or not an exhaust cam phase difference DCAEX is not smaller than a predetermined abnormal reference value DCAEX_ERR. The exhaust cam phase difference DCAEX is an absolute value |CAEX_CMD−CAEX| of the difference between a target exhaust cam phase CAEX_CMD, referred to hereinafter, and the exhaust cam phase CAEX, and the abnormal reference value CAEX_ERR is set to a predetermined positive value with reference to which it is estimated, when the exhaust cam phase difference DCAEX is larger than the abnormal reference value DCAEX_ERR, that the variable exhaust cam phase mechanism 22 is in an abnormal state.

If the answer to the question of the step 70 is negative (NO), i.e. if the variable exhaust cam phase mechanism 22 is in a normal state, to indicate that the exhaust-side first delay process is not being performed, the process proceeds to a step 78, wherein the exhaust-side first delay flag F_EX_DLY1 is set to 0, followed by terminating the present process.

On the other hand, if the answer to the question of the step 70 is affirmative (YES), the process proceeds to a step 71, wherein it is determined whether or not the exhaust cam phase CAEX is not smaller than a predetermined abnormal retard reference value CAEX_ERR1. The abnormal retard reference value CAEX_ERR1 is set to such a value as will cause CAEX<CAEX_ERR1 to always hold when the variable exhaust cam phase mechanism 22 is in a normal state, and will cause CAEX≥CAEX_ERR1 to hold only when the variable exhaust cam phase mechanism 22 is in an abnormal retard state e.g. due to the fact that the exhaust cam phase control valve 22a is in the foreign matter-caught state.

If the answer to the question of the step 71 is affirmative (YES), i.e. if the variable exhaust cam phase mechanism 22 is in the abnormal retard state, the process proceeds to a step 72, wherein it is determined whether or not the exhaust-side first delay flag F_EX_DLY1 is equal to 1. If the answer to the question of the step 72 is negative (NO), i.e. if the exhaust-side first delay process is not being performed, the process proceeds to a step 73, wherein a count value CT3 of an exhaust-side first delay counter is set to a predetermined exhaust-side first delay value EX_DLY1.

Next, the process proceeds to a step 74, wherein the exhaust-side first delay flag F_EX_DLY1 is set to 1 to indicate that the exhaust-side first delay process is being performed.

After the exhaust-side first delay flag F_EX_DLY1 is thus set to 1 in the step 74, the answer to the question of the above-mentioned step 72 becomes affirmative (YES) in the next and subsequent times of execution of this step, and in this case, the process proceeds to a step 75, wherein the count value CT3 of the exhaust-side first delay counter is set to a value (CT3$z$−1) calculated by subtracting 1 from the immediately preceding value CT3$z$. That is, the count value CT3 of the exhaust-side first delay counter is decremented by 1.

In a step 76 following the above step 74 or 75, it is determined whether or not the count value CT3 of the exhaust-side first delay counter is equal to 0. If the answer to the question of the step 76 is negative (NO), i.e. if CT3≠0 holds, the present process is immediately terminated.

On the other hand, if the answer to the question of the step 76 is affirmative (YES), i.e. if a state in which CAEX≥CAEX_ERR1 holds has continued for a time period corresponding to a value ΔT·EX_DLY1, it is determined that the exhaust-side cleaning control process should be performed due to the fact that the variable exhaust cam phase mechanism 22 continues to be in the abnormal retard state, and to indicate this, the process proceeds to a step 77, wherein the exhaust-side cleaning condition flag F_EX_CLN is set to 1.

Next, the process proceeds to the above-mentioned step 78, wherein the exhaust-side first delay flag F_EX_DLY1 is set to 0 to indicate that the exhaust-side first delay process is terminated, followed by terminating the present process.

On the other hand, if the answer to the question of the step 71 is negative (NO), i.e. if CAEX<CAEX_ERR1 holds, the process proceeds to a step 79, wherein the exhaust-side second failure determination process is performed.

Figure 8:
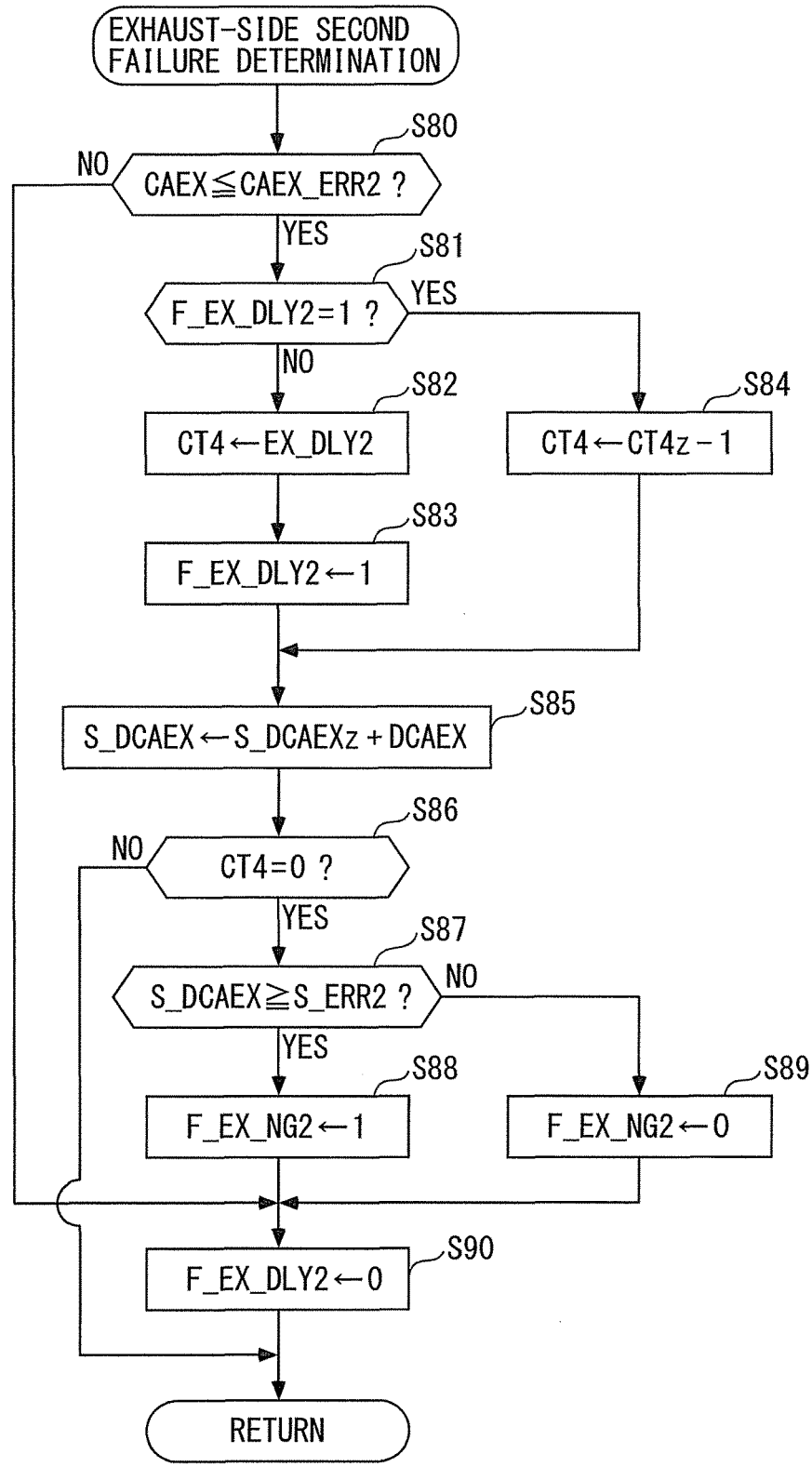
FIG. 8 is a flowchart of an exhaust-side second failure determination process.

The exhaust-side second failure determination process is for determining whether or not the variable exhaust cam phase mechanism 22 is in the above-mentioned exhaust-side second failure state, and is specifically performed as shown in FIG. 8.

Referring to FIG. 8, first, in a step 80, it is determined whether or not the exhaust cam phase CAEX is not larger than a predetermined origin fixation reference value CAEX_ERR2. The predetermined origin fixation reference value CAEX_ERR2 is set to a value slightly larger than the origin value CAEX_0.

If the answer to the question of the step 80 is negative (NO), i.e. if CAEX>CAEX_ERR2 holds, to indicate that the exhaust-side second delay process is not being performed, the process proceeds to a step 90, wherein the exhaust-side second delay flag F_EX_DLY2 is set to 0, followed by terminating the present process.

On the other hand, if the answer to the question of the step 80 is affirmative (YES), the process proceeds to a step 81, wherein it is determined whether or not the exhaust-side second delay flag F_EX_DLY2 is equal to 1. If the answer to the question of the step 81 is negative (NO), i.e. if the exhaust-side second delay process is not being performed, the process proceeds to a step 82, wherein a count value CT4 of an exhaust-side second delay counter is set to a predetermined exhaust-side second delay value EX_DLY2.

Next, the process proceeds to a step 83, wherein the exhaust-side second delay flag F_EX_DLY2 is set to 1 to indicate that the exhaust-side second delay process is being performed.

After the exhaust-side second delay flag F_EX_DLY2 is thus set to 1 in the step 83, the answer to the question of the above-mentioned step 81 becomes affirmative (YES) in the next and subsequent times of execution of this step, and in this case, the process proceeds to a step 84, wherein the count value CT4 of the exhaust-side second delay counter is set to a value (CT4$z$−1) calculated by subtracting 1 from the immediately preceding value CT4$z$.

In a step 85 following the above step 83 or 84, an integrated exhaust cam phase difference S_DCAEX, which is an integrated value of the exhaust cam phase difference DCAEX, is set to a sum S_DCAEX$z$+DCAEX of the immediately preceding value S_DCAEX$z$ of the exhaust cam phase difference DCAEX and the exhaust cam phase difference DCAEX. In this case, an initial value of the immediately preceding value S_DCAEX$z$ of the integrated exhaust cam phase difference is set to 0.

Next, the process proceeds to a step 86, wherein it is determined whether or not the count value CT4 of the exhaust-side second delay counter is equal to 0. If the answer to the question of the step 86 is negative (NO), i.e. if CT4≠0 holds, the present process is immediately terminated.

On the other hand, if the answer to the question of the step 86 is affirmative (YES), i.e. if a state in which CAEX≤CAEX_ERR2 holds has continued for a time period corresponding to a value ΔT·EX_DLY2, the process proceeds to a step 87, wherein it is determined whether or not the integrated exhaust cam phase difference S_DCAEX is not smaller than the above-mentioned predetermined second failure reference value S_ERR2.

If the answer to the question of the step 87 is affirmative (YES), i.e. if S_DCAEX≥S_ERR2 holds, it is determined that the variable exhaust cam phase mechanism 22 is in the exhaust-side second failure state, and to indicate this, the process proceeds to a step 88, wherein the exhaust-side second failure flag F_EX_NG2 is set to 1.

On the other hand, if the answer to the question of the step 87 is negative (NO), i.e. if S_DCAEX<S_ERR2 holds, it is determined that the variable exhaust cam phase mechanism 22 is not in the exhaust-side second failure state, and to indicate this, the process proceeds to a step 89, wherein the exhaust-side second delay flag F_EX_DLY2 is set to 0.

In the step 90 following the above step 88 or 89, to indicate that the exhaust-side second delay process is terminated, the exhaust-side second delay flag F_EX_DLY2 is set to 0, followed by terminating the present process.

Referring again to FIG. 7, after the exhaust-side second failure determination process is performed in the step 79 as described above, the exhaust-side operation determination process in FIG. 7 is terminated.

Referring again to FIG. 4, after the exhaust-side operation determination process is performed in the step 29 as described above, the operation determination process in FIG. 4 is terminated.

Referring again to FIG. 3, after the operation determination process is performed in the step 1 as described above, the process proceeds to a step 2, wherein it is determined whether or not the above described intake-side cleaning condition flag F_IN_CLN is equal to 1.

If the answer to the question of the step 2 is affirmative (YES), it is determined that the intake-side cleaning control process should be performed, and the process proceeds to a step 3, wherein the intake-side cleaning control process is performed. The intake-side cleaning control process is specifically performed as shown in FIG. 9.

Figure 9:
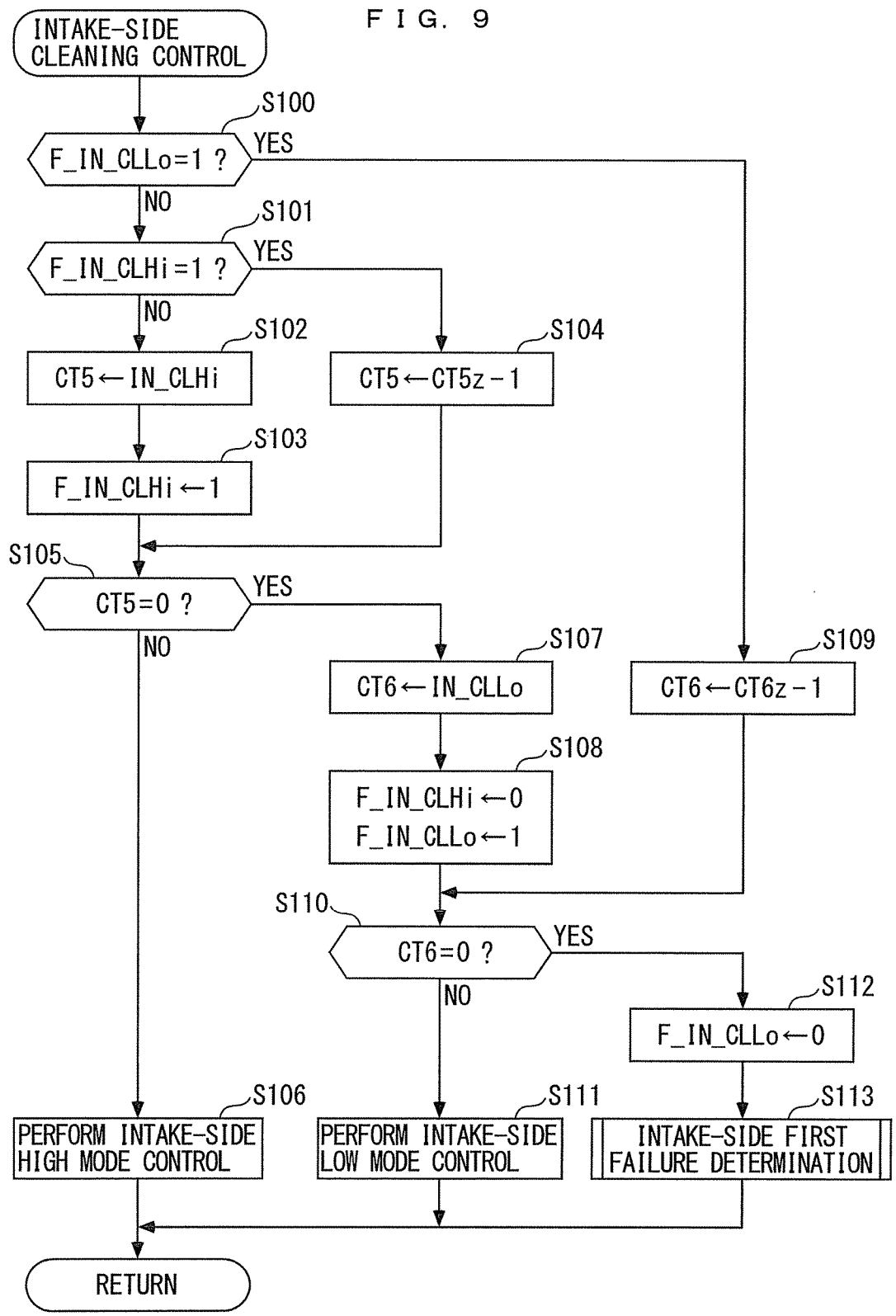
FIG. 9 is a flowchart of an intake-side cleaning control process.

Referring FIG. 9, first, in a step 100, it is determined whether or not an intake-side low-mode flag F_IN_CLLo is equal to 1. If the answer to the question of the step 100 is negative (NO), i.e. if an intake-side low-mode control process is not being performed, the process proceeds to a step 101, wherein it is determined whether or not an intake-side high-mode flag F_IN_CLHi is equal to 1.

If the answer to the question of the step 101 is negative (NO), i.e. if an intake-side high-mode control process is not being performed, it is determined that the intake-side high-mode control process should be performed, and the process proceeds to a step 102, wherein a count value CT5 of an intake-side high-mode counter is set to a predetermined intake-side high-mode value IN_CLHi.

Next, the process proceeds to a step 103, wherein to indicate that the intake-side high-mode control process is being performed, the intake-side high-mode flag F_IN_CLHi is set to 1.

After the intake-side high-mode flag F_IN_CLHi is thus set to 1 in the step 103, the answer to the question of the above-mentioned step 101 becomes affirmative (YES) in the next and subsequent times of execution of this step, and in this case, the process proceeds to a step 104, wherein the count value CT5 of the intake-side high-mode counter is set to a value (CT5z−1) calculated by subtracting 1 from the immediately preceding value CT5z.

In a step 105 following the above step 103 or 104, it is determined whether or not the count value CT5 of the intake-side high-mode counter is equal to 0. If the answer to the question of the step 105 is negative (NO), i.e. if CT5≠0, the process proceeds to a step 106, wherein the intake-side high-mode control process is performed, followed by terminating the present process. In the intake-side high-mode control process, the duty ratio of control input signal to the intake cam phase control valve 12a is set to 100%, and the control input signal thus set is supplied to the intake cam phase control valve 12a.

On the other hand, if the answer to the question of the step 105 is affirmative (YES), i.e. if a time period over which the intake-side high-mode control process has been performed reaches a time period corresponding to a value ΔT·IN_CLHi, it is determined that the intake-side high-mode control process should be terminated and the intake-side low-mode control process should be performed, and hence the process proceeds to a step 107, wherein a count value CT6 of an intake-side low-mode counter is set to a predetermined intake-side low-mode value IN_CLLo.

Next, the process proceeds to a step 108, wherein to indicate that the intake-side high-mode control process is terminated, the intake-side high-mode flag F_IN_CLHi is set to 0, and to indicate that the intake-side low-mode control process is being performed, the intake-side low-mode flag F_IN_CLLo is set to 1.

After the intake-side low-mode flag F_IN_CLLo is thus set to 1 in the step 108, the answer to the question of the above-mentioned step 100 becomes affirmative (YES) in the next and subsequent times of execution of this step, and in this case, the process proceeds to a step 109, wherein the count value CT6 of the intake-side low-mode counter is set to a value (CT6z−1) calculated by subtracting 1 from the immediately preceding value CT6z.

In a step 110 following the above step 108 or 109, it is determined whether or not the count value CT6 of the intake-side low-mode counter is equal to 0. If the answer to the question of the step 110 is negative (NO), i.e. if CT6≠0 holds, the process proceeds to a step 111, wherein the intake-side low-mode control process is performed, followed by terminating the present process. In the intake-side low-mode control process, the duty ratio of the control input signal to the intake cam phase control valve 12a is set to 0%, whereby the supply of the control input signal to the intake cam phase control valve 12a is stopped.

On the other hand, if the answer to the question of the step 110 is affirmative (YES), i.e. if a time period over which the intake-side low-mode control process has been performed reaches a time period corresponding to a value ΔT·IN_CLLo, it is determined that the intake-side low-mode control process should be terminated, and to indicate this, the process proceeds to a step 112, wherein the intake-side low-mode flag F_IN_CLLo is set to 0.

Then, the process proceeds to a step 113, wherein the intake-side first failure determination process is performed. The intake-side first failure determination process is specifically performed as shown in FIG. 10.

Figure 10:
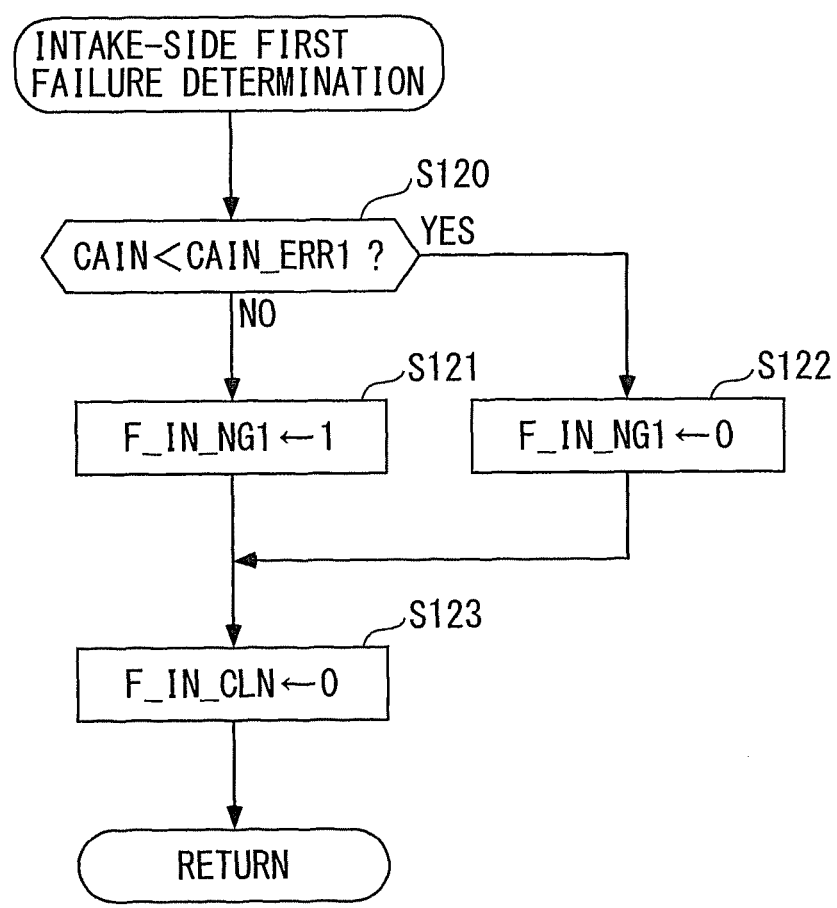
FIG. 10 is a flowchart of an intake-side first failure determination process.

Referring to FIG. 10, first, in a step 120, it is determined whether or not the intake cam phase CAIN is smaller than the above-mentioned abnormal advance reference value CAIN_ERR1.

If the answer to the question of the step 120 is negative (NO), it is determined that the variable intake cam phase mechanism 12 is in the intake-side first failure state, and to indicate this, the process proceeds to a step 121, wherein the intake-side first failure flag F_IN_NG1 is set to 1.

On the other hand, if the answer to the question of the step 120 is affirmative (YES), i.e. if CAIN<CAIN_ERR1 holds, it is determined that the intake-side first failure state is not in the variable intake cam phase mechanism 12, and to indicate this, the process proceeds to a step 122, wherein the intake-side first failure flag F_IN_NG1 is set to 0.

In a step 123 following the above step 121 or 122, to indicate that the intake-side cleaning control process is terminated, the intake-side cleaning condition flag F_IN_CLN is set to 0, followed by terminating the present process.

Referring again to FIG. 9, after the intake-side first failure determination process is performed in the step 113 as described above, the intake-side cleaning control process in FIG. 9 is terminated.

Referring again to FIG. 3, after the intake-side cleaning control process is performed in the step 3 as described above, the process proceeds to a step 4, wherein an exhaust-side origin control process is performed. In the exhaust-side origin control process, the duty ratio of control input signal to be supplied to the exhaust cam phase control valve 22a is set to 0%. That is, the supply of the control input signal to the exhaust cam phase control valve 22a is stopped, whereby the exhaust cam phase CAEX is held at the predetermined origin value CAEX_0. After the exhaust-side origin control process is performed in the step 4 as described above, the present process is immediately terminated.

On the other hand, if the answer to the question of the above-mentioned step 2 is negative (NO), i.e. if the intake-side cleaning control process is not being performed, the process proceeds to a step 5, wherein it is determined whether or not the above-mentioned exhaust-side cleaning condition flag F_EX_CLN is equal to 1.

If the answer to the question of the step 5 is affirmative (YES), it is determined that the exhaust-side cleaning control process should be performed, and the process proceeds to a step 6, wherein the exhaust-side cleaning control process is performed. The exhaust-side cleaning control process is specifically performed as shown in FIG. 11.

Figure 11:
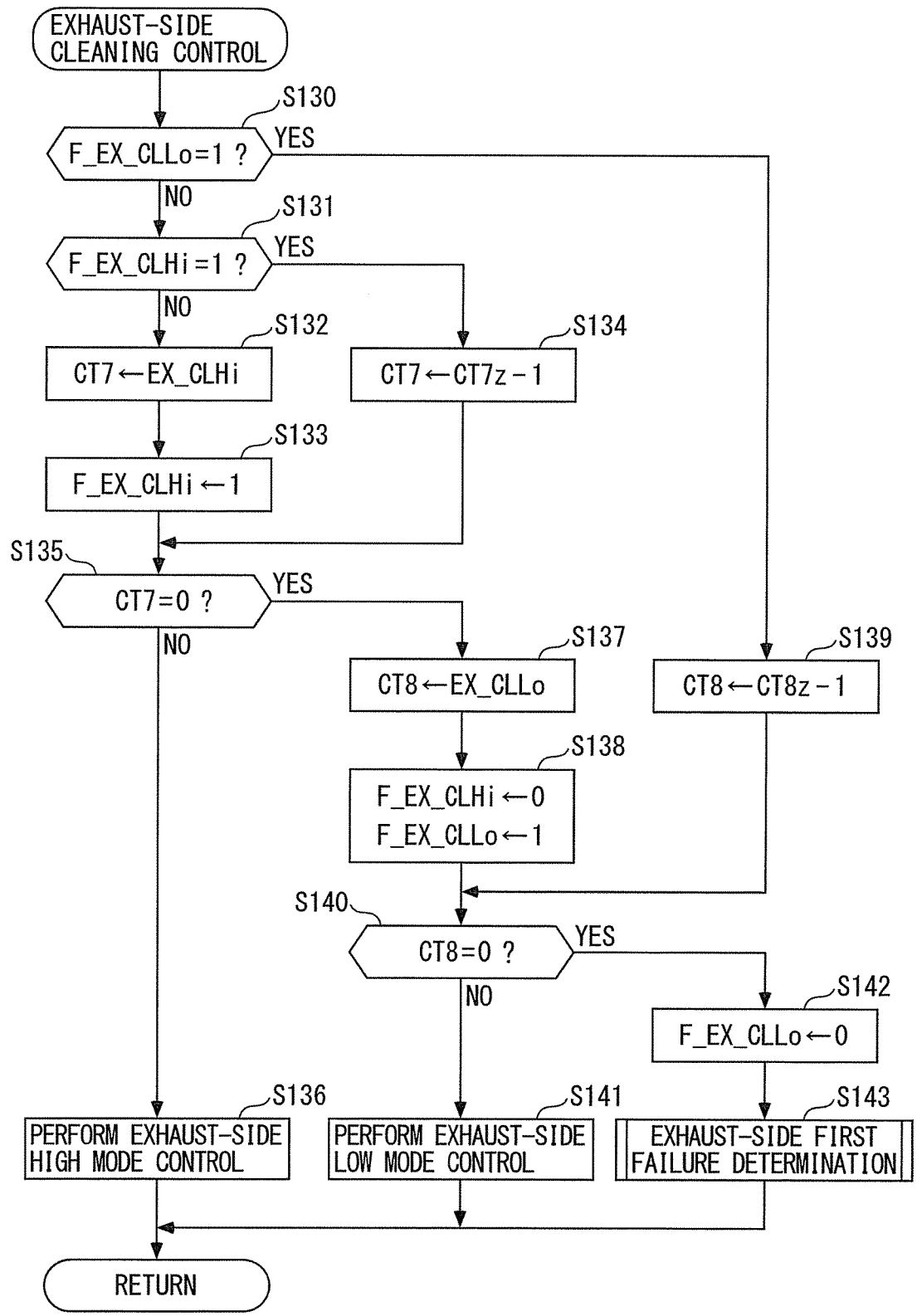
FIG. 11 is a flowchart of an exhaust-side cleaning control process.

Referring to FIG. 11, first, in a step 130, it is determined whether or not an exhaust-side low-mode flag F_EX_CLLo is equal to 1. If the answer to the question of the step 130 is negative (NO), i.e. if the exhaust-side low-mode control process is not being performed, the process proceeds to a step 131, wherein it is determined whether or not an exhaust-side high-mode flag F_EX_CLHi is equal to 1.

If the answer to the question of the step 131 is negative (NO), i.e. if an exhaust-side high-mode control process is not being performed, it is determined that the exhaust-side high-mode control process should be performed, and the process proceeds to a step 132, wherein a count value CT7 of an exhaust-side high-mode counter is set to a predetermined exhaust-side high-mode value EX_CLHi.

Next, the process proceeds to a step 133, wherein to indicate that the exhaust-side high-mode control process is being performed, the exhaust-side high-mode flag F_EX_CLHi is set to 1.

After the exhaust-side high-mode flag F_EX_CLHi is thus set to 1 in the step 133, the answer to the question of the above-mentioned step 131 becomes affirmative (YES) in the next and subsequent times of execution of this step, and in this case, the process proceeds to a step 134, wherein the count value CT7 of the exhaust-side high-mode counter is set to a value (CT7z−1) calculated by subtracting 1 from the immediately preceding value CT7z.

In a step 135 following the above step 133 or 134, it is determined whether or not the count value CT7 of the exhaust-side high-mode counter is equal to 0. If the answer to the question of the step 135 is negative (NO), i.e. if CT7≠0 holds, the process proceeds to a step 136, wherein the exhaust-side high-mode control process is performed, followed by terminating the present process. In the exhaust-side high-mode control process, the duty ratio of control input signal to the exhaust cam phase control valve 22a is set to 100%, and the control input signal thus set is supplied to the exhaust cam phase control valve 22a.

On the other hand, if the answer to the question of the step 135 is affirmative (YES), i.e. if a time period over which the exhaust-side high-mode control process has been performed reaches a time period corresponding to a value ΔT·EX_CLHi, it is determined that the exhaust-side high-mode control process should be terminated and the exhaust-side low-mode control process should be performed, and the process proceeds to a step 137, wherein a count value CT8 of an exhaust-side low-mode counter is set to a predetermined exhaust-side low-mode value EX_CLLo.

Next, the process proceeds to a step 138, wherein to indicate that the exhaust-side high-mode control process is terminated, the exhaust-side high-mode flag F_EX_CLHi is set to 0, and to indicate that the exhaust-side low-mode control process is being performed, the exhaust-side low-mode flag F_EX_CLLo is set to 1.

After the exhaust-side low-mode flag F_EX_CLLo is thus set to 1 in the step 138, the answer to the question of the above-mentioned step 130 becomes affirmative (YES) in the next and subsequent times of execution of this step, and in this case, the process proceeds to a step 139, wherein the count value CT8 of the exhaust-side low-mode counter is set to a value (CT8z−1) calculated by subtracting 1 from the immediately preceding value CT8z.

In a step 140 following the above step 138 or 139, it is determined whether or not the count value CT8 of the exhaust-side low-mode counter is equal to 0. If the answer to the question of the step 140 is negative (NO), i.e. if CT8≠0 holds, the process proceeds to a step 141, wherein the exhaust-side low-mode control process is performed, followed by terminating the present process. In the exhaust-side low-mode control process, the duty ratio of control input signal to the exhaust cam phase control valve 22a is set to 0%, whereby the supply of the control input signal to the exhaust cam phase control valve 22a is stopped.

On the other hand, if the answer to the question of the step 140 is affirmative (YES), i.e. a time period over which the exhaust-side low-mode control process has been performed reaches a time period corresponding to a value ΔT·EX_CLLo, it is determined that the exhaust-side low-mode control process should be terminated, and to indicate this, the process proceeds to a step 142, wherein the exhaust-side low-mode flag F_EX_CLLo is set to 0.

Next, the process proceeds to a step 143, wherein an exhaust-side first failure determination process is performed. The exhaust-side first failure determination process is specifically performed as shown in FIG. 12.

Figure 12:
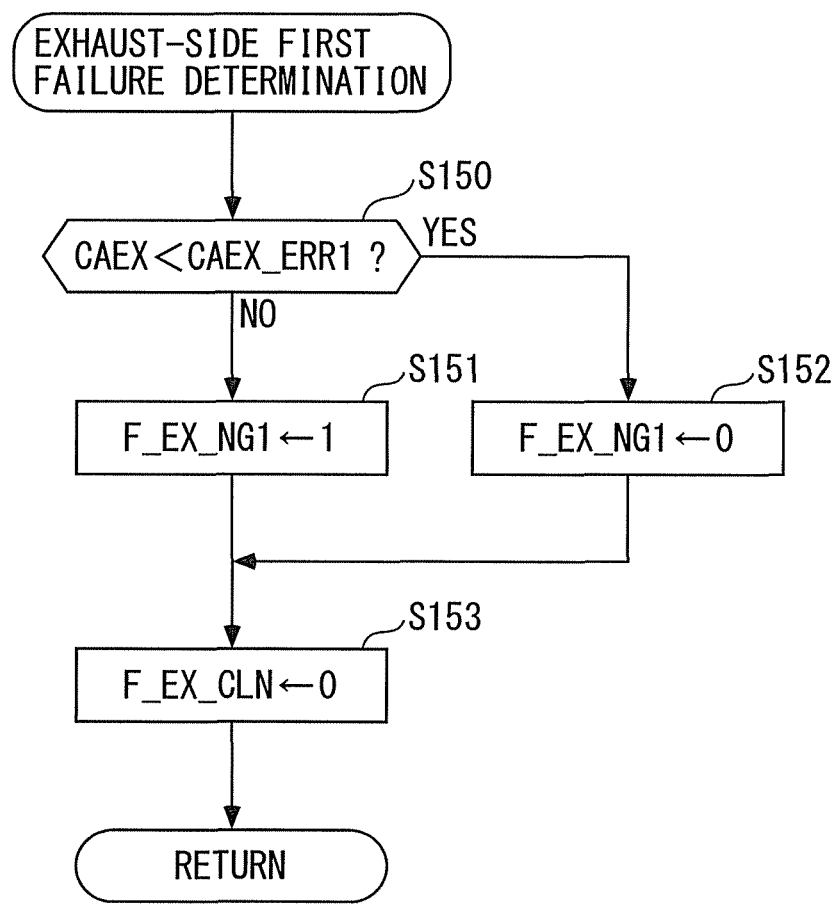
FIG. 12 is a flowchart of an exhaust-side first failure determination process.

Referring to FIG. 12, first, in a step 150, it is determined whether or not the exhaust cam phase CAEX is smaller than the above-mentioned abnormal retard reference value CAEX_ERR1.

If the answer to the question of the step 150 is negative (NO), it is determined that the variable exhaust cam phase mechanism 22 is in the exhaust-side first failure state, and to indicate this, the process proceeds to a step 151, wherein the exhaust-side first failure flag F_EX_NG1 is set to 1.

On the other hand, if the answer to the question of the step 150 is affirmative (YES), i.e. if CAEX<CAEX_ERR1 holds, it is determined that there the variable exhaust cam phase mechanism 22 is not in the exhaust-side first failure state, and to indicate this, the process proceeds to a step 152, wherein the exhaust-side first failure flag F_EX_NG1 is set to 0.

In a step 153 following the above step 151 or 152, to indicate that the exhaust-side cleaning control process is terminated, the exhaust-side cleaning condition flag F_EX_CLN is set to 0, followed by terminating the present process.

Referring again to FIG. 11, after the exhaust-side first failure determination process is performed in the step 143 as described above, the exhaust-side cleaning control process in FIG. 11 is terminated.

Referring again to FIG. 3, after the exhaust-side cleaning control process is performed in the step 6 as described above, the process proceeds to a step 7, wherein an intake-side origin control process is performed. In the intake-side origin control process, the duty ratio of control input signal to be supplied to the intake cam phase control valve 12a is set to 0%. That is, the supply of the control input signal to the intake cam phase control valve 12*a* is stopped, whereby the intake cam phase CAIN is held at the predetermined origin value CAIN_0. After the intake-side origin control process is performed in the step 7 as described above, the present process is terminated.

On the other hand, if the answer to the question of the above-mentioned step 5 is negative (NO), i.e. if neither the intake-side cleaning control process nor the exhaust-side cleaning control process is being performed, the process proceeds to a step 8, wherein it is determined whether or not the intake-side first failure flag F_IN_NG1 is equal to 1.

If the answer to the question of the step 8 is affirmative (YES), i.e. if the variable intake cam phase mechanism 12 is in the intake-side first failure state, the process proceeds to a step 9, wherein an intake-side stop process is performed. In the intake-side stop process, the supply of the control input signal to the intake cam phase control valve 12*a* is stopped.

Next, the process proceeds to a step 10, wherein the exhaust-side origin control process is performed similarly to the above-mentioned step 4. More specifically, the exhaust cam phase CAEX is held at the predetermined origin value CAEX_0 by stopping the supply of the control input signal to the exhaust cam phase control valve 22*a*. After the exhaust-side origin control process is performed in the step 10 as described above, the present process is terminated.

On the other hand, if the answer to the question of the above-mentioned step 8 is negative (NO), the process proceeds to a step 11, wherein it is determined whether or not the exhaust-side first failure flag F_EX_NG1 is equal to 1. If the answer to the question of the step 11 is affirmative (YES), i.e. if the variable exhaust cam phase mechanism 22 is in the exhaust-side first failure state, the process proceeds to a step 12, wherein an exhaust-side stop process is performed. In the exhaust-side stop process, the supply of the control input signal to the exhaust cam phase control valve 22*a* is stopped.

Next, the process proceeds to a step 13, wherein the intake-side origin control process is performed similarly to the above-mentioned step 10. That is, the intake cam phase CAIN is held at the predetermined origin value CAIN_0 by stopping the supply of the control input signal to the intake cam phase control valve 12*a*. After the intake-side origin control process is performed in the step 13 as described above, the present process is terminated.

On the other hand, if the answer to the question of the step 11 is negative (NO), the process proceeds to a step 14, wherein a normal control process is performed. The normal control process is specifically performed as shown in FIG. 13.

Figure 13:
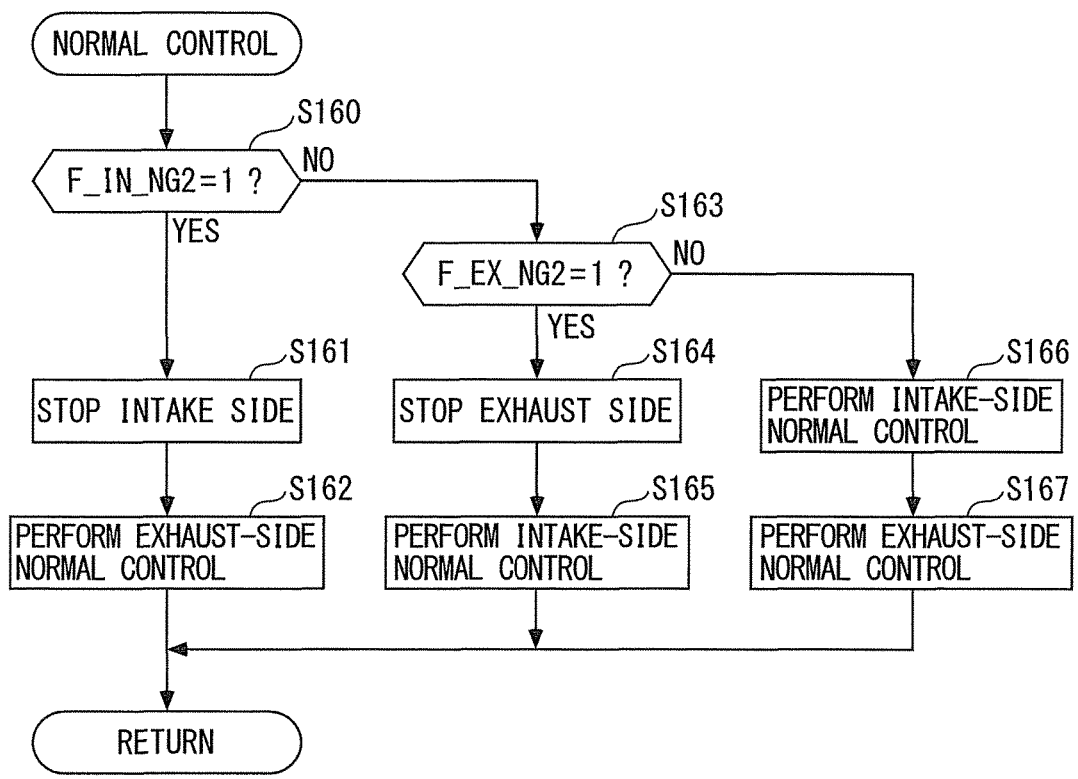
FIG. 13 is a flowchart of a normal control process.

Referring to FIG. 13, first, in a step 160, it is determined whether or not the above-mentioned intake-side second failure flag F_IN_NG2 is equal to 1. If the answer to the question of the step 160 is affirmative (YES), i.e. the variable intake cam phase mechanism 12 is in the intake-side second failure state, the process proceeds to a step 161, wherein the intake-side stop process is performed similarly to the above-mentioned step 9. That is, the supply of the control input signal to the intake cam phase control valve 12*a* is stopped.

Next, the process proceeds to a step 162, wherein an exhaust-side normal control process is performed. In the exhaust-side normal control process, a demanded torque TRQ is calculated by searching a map, not shown, according to the engine speed NE and the accelerator pedal opening AP, and a target exhaust cam phase CAEX_CMD is calculated by searching a map, not shown, according to the calculated demanded torque TRQ and the engine speed NE.

Then, the duty ratio of the control input signal to the exhaust cam phase control valve 22*a* is set such that the exhaust cam phase CAEX becomes equal to the target exhaust cam phase CAEX_CMD, and the control input signal thus set is supplied to the exhaust cam phase control valve 22*a*. Consequently, the exhaust cam phase CAEX is controlled such that it becomes equal to the target exhaust cam phase CAEX_CMD. After the exhaust-side normal control process is performed in the step 162 as described above, the present process is terminated.

On the other hand, if the answer to the question of the step 160 is negative (NO), the process proceeds to a step 163, wherein it is determined whether or not the above-described exhaust-side second failure flag F_EX_NG2 is equal to 1. If the answer to the question of the step 163 is affirmative (YES), i.e. if the variable exhaust cam phase mechanism 22 is in the exhaust-side second failure state, the process proceeds to a step 164, wherein the exhaust-side stop process is performed similarly to the above-mentioned step 12. That is, the supply of the control input signal to the exhaust cam phase control valve 22*a* is stopped.

Next, the process proceeds to a step 165, wherein the intake-side normal control process is performed. In the intake-side normal control process, the demanded torque TRQ is calculated by searching a map, not shown, according to the engine speed NE and the accelerator pedal opening AP, and the target intake cam phase CAIN_CMD is calculated by searching a map, not shown, according to the calculated demanded torque TRQ and the engine speed NE.

Then, the duty ratio of the control input signal to the intake cam phase control valve 12*a* is set such that the intake cam phase CAIN becomes equal to the target intake cam phase CAIN_CMD, and the control input signal thus set is supplied to the intake cam phase control valve 12*a*. Consequently, the intake cam phase CAIN is controlled such that it becomes equal to the target intake cam phase CAIN_CMD. After the intake-side normal control process is performed in the step 165 as described above, the present process is terminated.

On the other hand, if the answer to the question of the step 163 is negative (NO), the process proceeds to a step 166, wherein the intake-side normal control process is performed similarly to the above-mentioned step 165. Next, the process proceeds to a step 167, wherein the exhaust-side normal control process is performed similarly to the above-mentioned step 162, followed by terminating the present process.

Referring again to FIG. 3, after the normal control process is performed in the step 14 as described above, the cam phase control process in FIG. 3 is terminated.

Next, a description will be given of an example of control results (hereinafter referred to as "control result example") obtained when the above-described cam phase control process is performed. First, with reference to FIG. 14, a control result example is described which is obtained, in a case where the intake-side cam phase control valve 12*a* enters the foreign matter-caught state to place the variable intake cam phase mechanism 12 in the intake-side first failure state, by performing the intake-side cleaning control process to thereby resolve the foreign matter-caught state and resolve the intake-side first failure state.

Figure 14:
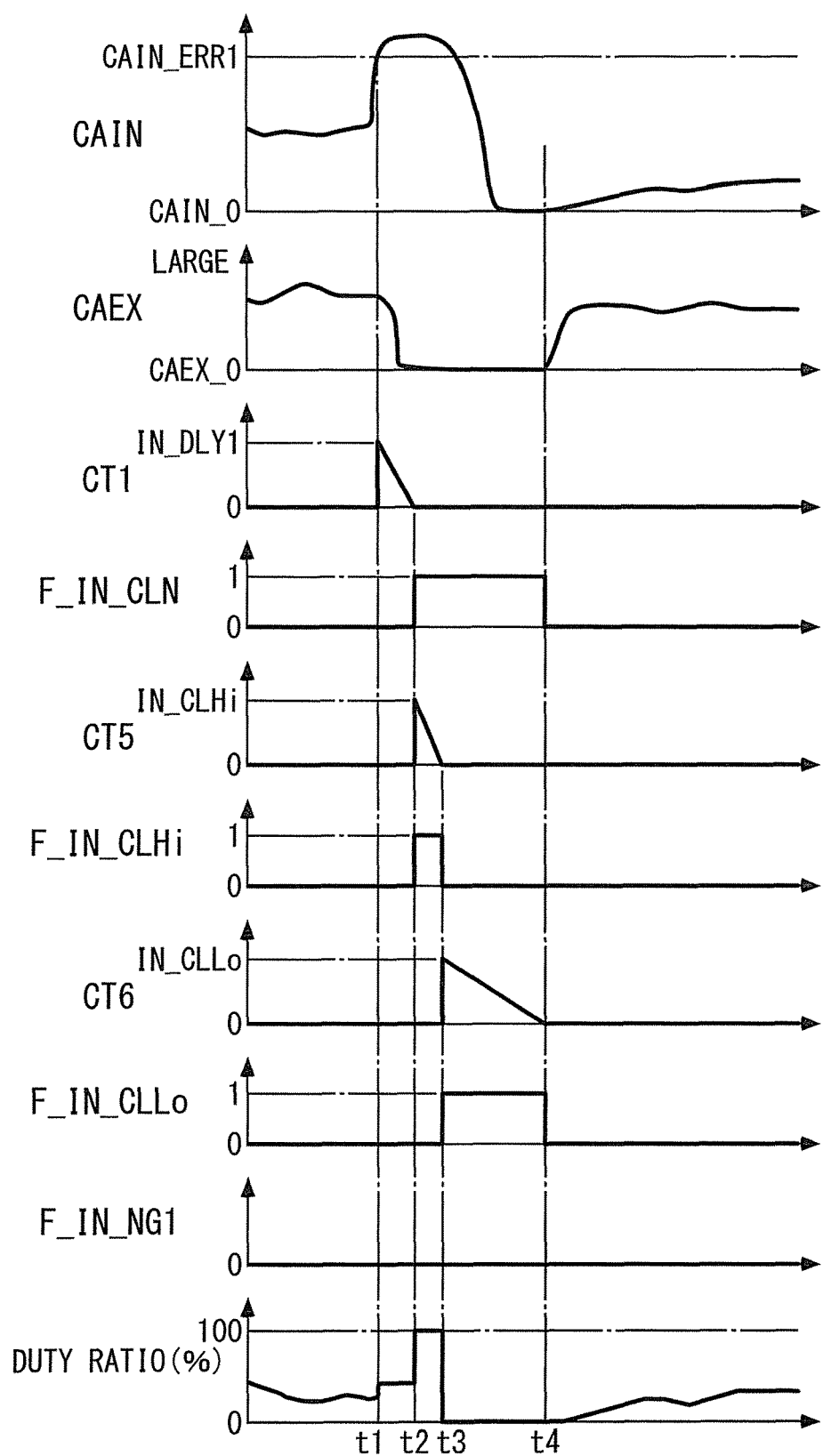
FIG. 14 is a timing diagram showing an example of control results when a first failure state is resolved in a case where the first failure state occurs in the variable intake cam phase mechanism, and the intake-side cleaning control process is performed.

Referring to FIG. 14, along with occurrence of the foreign matter-caught state of the intake-side cam phase control valve 12*a*, the intake cam phase CAIN is changed toward the advanced side, whereby the value thereof is increased. Then, at a time (time point t1) when CAIN≥CAIN_ERR1 holds, the answer to the question of the above-mentioned step 41 becomes affirmative (YES), whereby the intake-side first delay process is started and the count value CT1 of the intake-side first delay counter is set to the above-mentioned intake-side first delay value IN_DLY1. At the same time, the exhaust-side origin control process is started, whereby the exhaust cam phase CAEX is controlled to become equal to the origin value CAEX_0.

Thereafter, at a time (time point t2) when the intake-side delay process is terminated and CT1=0 holds, the intake-side cleaning condition flag F_IN_CLN is set to 1, whereby the intake-side cleaning control process is started, and at the same time the intake-side high-mode flag F_IN_CLHi is set to 1, whereby the intake-side high-mode control process is started. This sets the count value CT5 of the intake-side high-mode counter to the intake-side high-mode value IN_CLHi, and sets the duty ratio of the control input signal to the intake cam phase control valve 12a to 100%.

Then, as the control proceeds, at a time (time point t3) when CT5=0 holds, the intake-side high-mode flag F_IN_CLHi is set to 0 and the intake-side high-mode control process is terminated. At the same time, the intake-side low-mode control process is started by setting the intake-side low-mode flag F_IN_CLLo to 1. This sets the count value CT6 of the intake-side low-mode counter to the intake-side low-mode value IN_CLLo, and sets the duty ratio of the control input signal to the intake cam phase control valve 12a to 0%. During execution of the intake-side low-mode control process, the foreign matter-caught state of the intake-side cam phase control valve 12a is resoled so that the intake cam phase CAIN is changed to the origin value CAIN_0.

Thereafter, at a timing (time point t4) when CT6=0 holds, the intake-side low-mode flag F_IN_CLLo and the intake-side cleaning condition flag F_IN_CLN are set to 0, and the intake-side low-mode control process and the intake-side cleaning control process are terminated. At the same time, the intake-side first failure determination process is performed. In the intake-side first failure determination process, CAIN<CAIN_ERR1 holds and hence the answer to the question of the step 120 becomes affirmative (YES), so that the intake-side first failure flag F_IN_NG1 is held at 0, whereby all the answers to the questions of the above-mentioned steps 2, 5, 8, 11, 160, and 163 become negative (NO), so that from that time on, the intake-side normal control process and the exhaust-side normal control process are performed.

Figure 15:
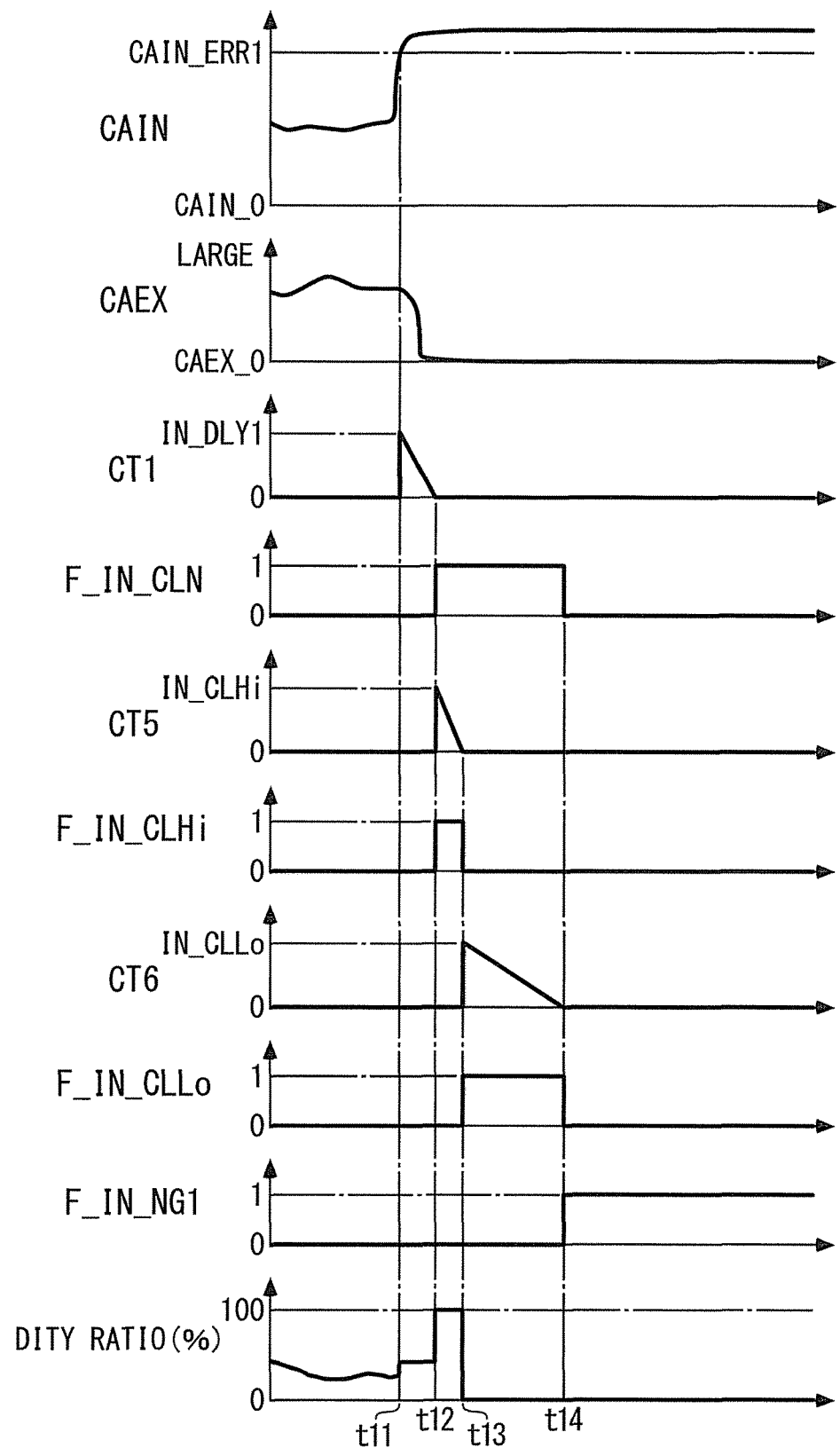
FIG. 15 is a timing diagram showing an example of control results when the first failure state is not resolved in a case where the first failure state occurs in the variable intake cam phase mechanism, and the intake-side cleaning control process is performed.

Next, with reference to FIG. 15, a control result example is described which is obtained, in a case where the intake-side cam phase control valve 12a enters the foreign matter-caught state, when in spite of execution of the intake-side cleaning control process, the foreign matter-caught state is not resolved and the intake-side first failure state is not resolved.

Referring to FIG. 15, after a time (time point t11) when CAIN≥CAIN_ERR1 holds, the intake-side first delay process is started, and the count value CT1 of the intake-side delay counter is set to the above-described intake-side first delay value IN_DLY1. At the same time, the exhaust-side origin control process is started, whereby the exhaust cam phase CAEX is controlled such that it becomes equal to the origin value CAEX_0.

Thereafter, the exhaust-side delay process is terminated, and at a time (time point t12) when CT1=0 holds, the intake-side cleaning control process and the intake-side high-mode control process are started. This sets the count value CT5 of the intake-side high-mode counter to the intake-side high-mode value IN_CLHi, and sets the duty ratio of the control input signal to the intake cam phase control valve 12a to 100%.

Then, as the control proceeds, at a time (time point t13) when CT5=0 holds, the intake-side high-mode control process is terminated, and at the same time the intake-side low-mode control process is started. This sets the count value CT6 of the intake-side low-mode counter to the intake-side low-mode value IN_CLLo, and set the duty ratio of the control input signal to the intake cam phase control valve 12a to 0%.

Next, as the control proceeds, at a time (time point t14) when CT6=0 holds, the intake-side low-mode flag F_IN_CLLo is set to 0, whereby the intake-side low-mode control process is terminated, and at the same time, the intake-side first failure determination process is performed. In the intake-side first failure determination process, CAIN≥CAIN_ERR1 holds, and hence the answer to the question of the step 120 becomes negative (NO), so that the intake-side first failure flag F_IN_NG1 is set to 1, whereby the answer to the question of the above-mentioned step 8 becomes affirmative (YES), and from then on, the intake-side stop process and the exhaust-side origin control process are performed.

As described above, according to the control apparatus 1 of the present embodiment, in a case where CAIN≥CAIN_ERR1 holds, and it is estimated that the intake-side cam phase control valve 12a is in the foreign matter-caught state, the intake-side cleaning control process is performed. Then, even after the intake-side cleaning process is performed, if CAIN≥CAIN_ERR1 still holds, it is determined that the variable intake cam phase mechanism 12 is in the intake-side first failure state, and hence the intake-side stop process and the exhaust-side origin control process are performed. That is, the control of the variable intake cam phase mechanism 12 is stopped, and the variable exhaust cam phase mechanism 22 is controlled such that the exhaust cam phase CAEX becomes equal to the origin value CAEX_0.

Similarly to the above, in a case where CAEX≥CAEX_ERR1 holds, and it is estimated that the exhaust cam phase control valve 22a is in the foreign matter-caught state, the exhaust-side cleaning control process is performed. Then, even after the exhaust-side cleaning control process is performed, if CAEX≥CAEX_ERR1 still holds, it is determined that the variable exhaust cam phase mechanism 22 is in the exhaust-side first failure state, and hence the exhaust-side stop process and the intake-side origin control process are performed. That is, the control of the variable exhaust cam phase mechanism 22 is stopped, and the variable intake cam phase mechanism 12 is controlled such that the intake cam phase CAIN becomes equal to the origin value CAIN_0.

As described above, when controlling the variable intake cam phase mechanism 12 and the variable exhaust cam phase mechanism 22, when a failure state which will increase the valve overlap period occurs in one cam phase mechanism of the two, the intake-side origin control process or the exhaust-side origin control process is performed by the other cam phase mechanism such that the valve overlap period is reduced, whereby it is possible to prevent the valve overlap period from becoming too long, and thereby prevent the internal EGR amount from becoming too large and the scavenging gas amount from becoming too large. This makes it possible to ensure stable combustion of the mixture and improve the drivability. Consequently, it is possible to enhance marketability.

Further, in the intake-side origin control process, the intake cam phase CAIN is controlled such that it becomes equal to the origin value CAIN_0, and hence it is possible to control the intake cam phase CAIN to a value at which the valve overlap period becomes the shortest within a variable range thereof. Similarly to this, in the exhaust-side origin control process, the exhaust cam phase CAEX is controlled such that it becomes equal to the origin value CAEX_0, and hence it is possible to control the exhaust cam phase CAEX to a value at which the valve overlap period becomes the shortest within a variable range thereof. This makes it possible to positively obtain the same advantageous effects as described above.

Further, when it is determined that the variable intake cam phase mechanism 12 is in the intake-side second failure state, i.e. when the intake cam phase CAIN is fixed and held at the origin value CAIN_0 in spite of the fact that the control input signal is supplied to the intake cam phase control valve 12a so as to cause the intake cam phase CAIN to become a larger value than the origin value CAIN_0, the normal control process of the variable exhaust cam phase mechanism 22 is performed. Similarly to this, if it is determined that the variable exhaust cam phase mechanism 22 is in the exhaust-side second failure state, the normal control process of the variable intake cam phase mechanism 12 is performed.

In this case, when there has occurred the intake-side second failure state or the exhaust-side second failure state, since the intake cam phase CAIN is held at the origin value CAIN_0, or the exhaust cam phase CAEX is held at the origin value CAEX_0, the valve overlap period does not become longer than the normal overlap period, so that there is no need to control one cam phase mechanism of the two which is not in a failure state such that the valve overlap period becomes shorter than the normal valve overlap period. Therefore, when there has occurred the intake-side second failure state or the exhaust-side second failure state, by normally controlling the normal mechanism, it is possible to ensure stable combustion of the mixture and excellent drivability while positively avoiding the state in which the valve overlap period becomes too long, similarly to when the cam phase mechanisms are normal.

Further, although in the embodiment, as the variable intake cam phase mechanism and the variable exhaust cam phase mechanism, there are used respective hydraulically-driven types, by way of example, but they may be replaced by respective electrically-driven types each of which is formed by combining an electric motor and a gear mechanism. In this case, it is only required to perform, in the operation determination process in the step 1, the intake-side first failure determination process in FIG. 10, the intake-side second failure determination process in FIG. 6, the exhaust-side first failure determination process in FIG. 12, and the intake-side second failure determination process in FIG. 8, and omit the control processes in the steps 2 to 7.

Figure 2:
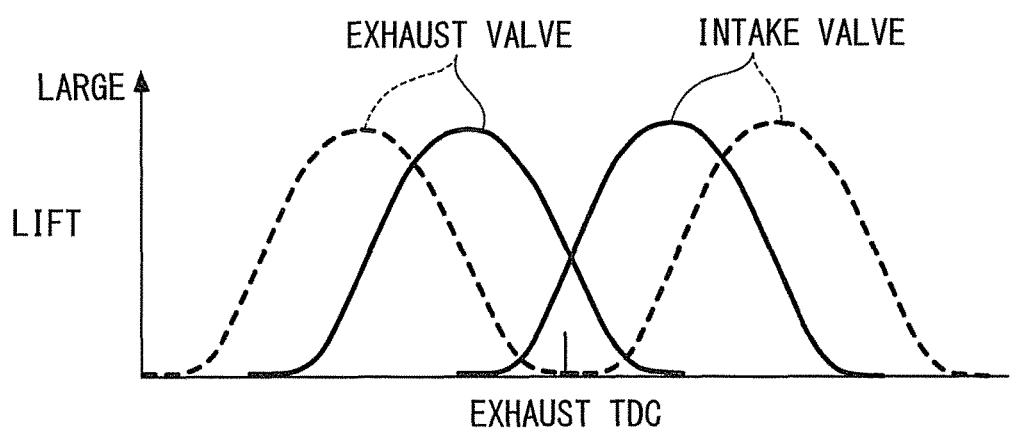
FIG. 2 is a diagram showing valve lift curves of an intake valve when an intake cam phase is set to most advanced value (solid line) and an origin value (broken line) by a variable intake cam phase mechanism, and valve lift curves of an exhaust valve when an exhaust cam phase is set to most retarded value (solid line) and an origin value (broken line) by a variable exhaust cam phase mechanism.

Further, although in the embodiment, the variable intake cam phase mechanism 12 and the variable exhaust cam phase mechanism 22 are used which are configured such that the valve overlap period becomes equal to 0 when the intake cam phase CAIN and the exhaust cam phase CAEX are held at the origin values CAIN_0 and CAEX_0, respectively, as shown in FIG. 2, by way of example, but instead of these, there may be used the variable intake cam phase mechanism 12 and the variable exhaust cam phase mechanism 22 which are configured such that when the intake cam phase CAIN and the exhaust cam phase CAEX are held at the origin values CAIN_0 and CAEX_0, respectively, there occurs a time period in which the intake valve 4 and the exhaust valve 5 are both closed, i.e. a time period of negative valve overlap.

Further, although in the embodiment, the variable exhaust cam phase mechanism 22 is normally controlled when there has occurred the intake-side second failure state, by way of example, but the variable exhaust cam phase mechanism 22 may be subjected to a control process for a failure time, instead of the normal control process, when there has occurred the intake-side second failure state. In this case, for example, the map for use in calculating the target exhaust cam phase CAEX_CMD may be switched from the map for normal control to the map for failure-time use. Similar to this, when there has occurred the exhaust-side second failure state, the variable intake cam phase mechanism 12 may be subjected to a control process for a failure time use, instead of the normal control process, and also in this case, the map for use in calculating the target intake cam phase CAIN_CMD may be switched from the map for normal control to the map for failure-time use.

Further, although in the present embodiment, the control apparatus of the present invention is applied to the internal combustion engine for a vehicle, by way of example, the control apparatus of the present invention is not limited to this, but can be applied to internal combustion engines for boats and other industrial machines.

It is further understood by those skilled in the art that the foregoing are preferred embodiment of the invention, and that various changes and modifications may be made without departing from the spirit and scope thereof.

What is claimed is:

1. A control apparatus for an internal combustion engine that includes a variable intake cam phase mechanism for changing an intake cam phase which is a phase of an intake cam for opening and closing an intake valve with respect to a crankshaft, and a variable exhaust cam phase mechanism for changing an exhaust cam phase which is a phase of an exhaust cam for opening and closing an exhaust valve with respect to the crankshaft, and is capable of changing a valve overlap period of the intake valve and the exhaust valve by changing one or more of the intake cam phase and the exhaust cam phase, the control apparatus controlling one or more of the variable intake cam phase mechanism and the variable exhaust cam phase mechanism, comprising:

intake cam phase acquisition means for acquiring the intake cam phase;

exhaust cam phase acquisition means for acquiring the exhaust cam phase;

first failure determination means for determining, by comparing one phase of the acquired intake cam phase and the acquired exhaust cam phase with a predetermined abnormal reference value, whether or not there has occurred a first failure state which is a failure state of one mechanism of the variable intake cam phase mechanism and the variable exhaust cam phase mechanism, which changes the one phase, in which the valve overlap period is altered;

first failure control means for controlling, when it is determined by said first failure determination means that there has occurred the first failure state of the one mechanism, another mechanism of the variable intake cam phase mechanism and the variable exhaust cam phase mechanism to shorten the valve overlap period;

second failure determination means for determining, based on one phase of the intake cam phase and the exhaust cam phase, whether or not there has occurred a second failure state which is a failure state of one mechanism of the variable intake cam phase mechanism and the variable exhaust cam phase mechanism, which changes the one phase, in which the valve overlap period is altered; and second failure control means for normally controlling, when it is determined by said second failure determination means that there has occurred the second failure state of the one mechanism, another mechanism of the variable intake cam phase mechanism and the variable exhaust cam phase mechanism.

2. The control apparatus according to claim 1, wherein said first failure control means controls, when there has occurred the first failure state of the one mechanism, the another mechanism such that a phase of the intake cam phase and the exhaust cam phase, which is changed by the another mechanism, becomes a value, which makes the valve overlap period shortest, within a variable range of the phase.

3. A control apparatus for an internal combustion engine that includes a variable intake cam phase mechanism for changing an intake cam phase which is a phase of an intake cam for opening and closing an intake valve with respect to a crankshaft, and a variable exhaust cam phase mechanism for changing an exhaust cam phase which is a phase of an exhaust cam for opening and closing an exhaust valve with respect to the crankshaft, and is capable of changing a valve overlap period of the intake valve and the exhaust valve by changing one or more of the intake cam phase and the exhaust cam phase, the control apparatus controlling one or more of the variable intake cam phase mechanism and the variable exhaust cam phase mechanism, comprising:

intake cam phase acquisition means for acquiring the intake cam phase;

exhaust cam phase acquisition means for acquiring the exhaust cam phase;

intake-side/exhaust-side operation determination process means for determining, based on one phase of the acquired intake cam phase and the acquired exhaust cam phase, whether or not there has occurred an abnormal operation state which is an abnormal operation state of one mechanism of the variable intake cam phase mechanism and the variable exhaust cam phase mechanism, which changes the one phase;

cleaning control process means for performing, when it is determined by said intake-side/exhaust-side operation determination process means that there has occurred the abnormal operation state of the one mechanism, a cleaning control for the one mechanism for resolving the abnormal operation state thereof;

first failure determination means for determining, by comparing the one phase acquired after performing the cleaning control with a predetermined abnormal reference value, whether or not there has occurred a first failure state which is a failure state of the one mechanism, in which the valve overlap period becomes longer than a defined overlap period; and first failure control means for controlling, when it is determined by said first failure determination means that there has occurred the first failure state of the one mechanism, another mechanism of the variable intake cam phase mechanism and the variable exhaust cam phase mechanism to shorten the valve overlap period.

4. The control apparatus according to claim 3, wherein said first failure control means controls, when there has occurred the first failure state of the one mechanism, the another mechanism such that a phase of the intake cam phase and the exhaust cam phase, which is changed by the another mechanism, becomes a value, which makes the valve overlap period shortest, within a variable range of the phase.

5. A method of controlling one or more of a variable intake cam phase mechanism and a variable exhaust cam phase mechanism for an internal combustion engine, comprising:

acquiring an intake cam phase;

acquiring an exhaust cam phase;

determining, by comparing one phase of the acquired intake cam phase and the acquired exhaust cam phase with a predetermined abnormal reference value, whether or not there has occurred a first failure state which is a failure state of one mechanism of a variable intake cam phase mechanism and a variable exhaust cam phase mechanism, which changes the one phase, in which a valve overlap period is altered;

controlling, when it is determined that there has occurred the first failure state of the one mechanism, another mechanism of the variable intake cam phase mechanism and the variable exhaust cam phase mechanism to shorten the valve overlap period;

determining, based on one phase of the intake cam phase and the exhaust cam phase, whether or not there has occurred a second failure state which is a failure state of one mechanism of the variable intake cam phase mechanism and the variable exhaust cam phase mechanism, which changes the one phase, in which the valve overlap period is altered; and normally controlling, when it is determined that there has occurred the second failure state of the one mechanism, another mechanism of the variable intake cam phase mechanism and the variable exhaust cam phase mechanism.

6. The method according to claim 5, wherein when it is determined that there has occurred the first failure state of the one mechanism, controlling the another mechanism such that a phase of the intake cam phase and the exhaust cam phase, which is changed by the another mechanism, becomes a value, which makes the valve overlap period shortest, within a variable range of the phase.

7. A method of controlling one or more of a variable intake cam phase mechanism and a variable exhaust cam phase mechanism for an internal combustion engine, comprising:

acquiring an intake cam phase;

acquiring an exhaust cam phase;

determining, based on one phase of the acquired intake cam phase and the acquired exhaust cam phase, whether or not there has occurred an abnormal operation state which is an abnormal operation state of one mechanism of the variable intake cam phase mechanism and the variable exhaust cam phase mechanism, which changes the one phase;

performing, when it is determined that there has occurred the abnormal operation state of the one mechanism, a cleaning control for the one mechanism for resolving the abnormal operation state thereof;

determining, by comparing the one phase acquired after performing the cleaning control with a predetermined abnormal reference value, whether or not there has occurred a first failure state which is a failure state of the one mechanism, in which a valve overlap period is altered; and controlling, when it is determined there has occurred the first failure state of the one mechanism, another mechanism of the variable intake cam phase mechanism and the variable exhaust cam phase mechanism to shorten the valve overlap period.

8. The method according to claim 7, wherein when it is determined that there has occurred the first failure state of the one mechanism, controlling the another mechanism such that a phase of the intake cam phase and the exhaust cam phase, which is changed by the another mechanism, becomes a value, which makes the valve overlap period shortest, within a variable range of the phase.

* * * * *